(12) United States Patent      (10) Patent No.:    US 12,563,290 B2

Ogawa                             (45) Date of Patent:       Feb. 24, 2026

(54) ELECTRONIC DEVICE CAPABLE OF CONTROLLING PROCESSING IN DIFFERENT DIVIDED IMAGE REGIONS IN DIFFERENT SHOOTING MODES, AND CONTROL METHOD OF ELECTRONIC DEVICE

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 18/416,976

(22) Filed: Jan. 19, 2024

(65) Prior Publication Data

US 2024/0163553 A1      May 16, 2024

Related U.S. Application Data

(63) Continuation of application No. PCT/JP2022/019861, filed on May 10, 2022.

(30) Foreign Application Priority Data

Jul. 26, 2021    (JP) ................................ 2021-121504

(51) Int. Cl.
     *H04N 23/667*       (2023.01)
     *H04N 5/262*        (2006.01)
            (Continued)

(52) U.S. Cl.
     CPC ......... *H04N 23/667* (2023.01); *H04N 5/2628* (2013.01); *H04N 23/62* (2023.01);
            (Continued)

(58) Field of Classification Search
     CPC .... H04N 5/2628; H04N 23/667; H04N 23/62; H04N 23/635; H04N 23/63; H04N 23/67;
                 (Continued)

(56) References Cited

U.S. PATENT DOCUMENTS

2009/0303342 A1* 12/2009 Corcoran ................ G06T 7/251
                                        348/222.1
2012/0120283 A1* 5/2012 Capata ...................... G06T 5/73
                                      348/E5.079
2016/0269615 A1* 9/2016 Deng ................... H04N 23/635

FOREIGN PATENT DOCUMENTS

JP      2010-226185 A    10/2010
JP      2012-160966 A     8/2012
                (Continued)

OTHER PUBLICATIONS

The above foreign patent documents Nos. 1-2 and 4 were in cited the International Search Report dated Jun. 14, 2022 of PCT/JP2022/019861, a copy of which is enclosed.

*Primary Examiner* — Kelly L Jerabek

(74) *Attorney, Agent, or Firm* — Cowan, Liebowitz & Latman, P.C.

(57) ABSTRACT

An electronic device includes a display control unit that performs control to display, on a display unit, a first assisting line that divides an image into at least a first region and a second region, so as to be superimposed on the image, and a control unit that performs control such that, in a first mode for shooting a first type of image, particular processing relating to shooting is inexecutable in the first region, and the particular processing is executable in the second region, and performs control such that, in a second mode for shooting a second type of image that is different from the first type of image, the particular processing is executable in a region including the first region and the second region.

17 Claims, 12 Drawing Sheets

(51) Int. Cl.

| | | |
|---|---|---|
| *H04N 23/60* | (2023.01) | |
| *H04N 23/62* | (2023.01) | |
| *H04N 23/63* | (2023.01) | |
| *H04N 23/67* | (2023.01) | |

(52) U.S. Cl.
CPC .......... *H04N 23/634* (2023.01); *H04N 23/64* (2023.01); *H04N 23/675* (2023.01)

(58) Field of Classification Search
CPC .... H04N 23/675; H04N 23/64; H04N 23/634; H04N 23/632; G02B 7/28; G03B 13/36; G03B 17/02; G03B 17/18
See application file for complete search history.

(56) References Cited

FOREIGN PATENT DOCUMENTS

| | | | |
|---|---|---|---|
| JP | 2014-137535 | A | 7/2014 |
| JP | 2016-123033 | A | 7/2016 |
| WO | 2009/028703 | A1 | 3/2009 |

* cited by examiner

FIG. 6

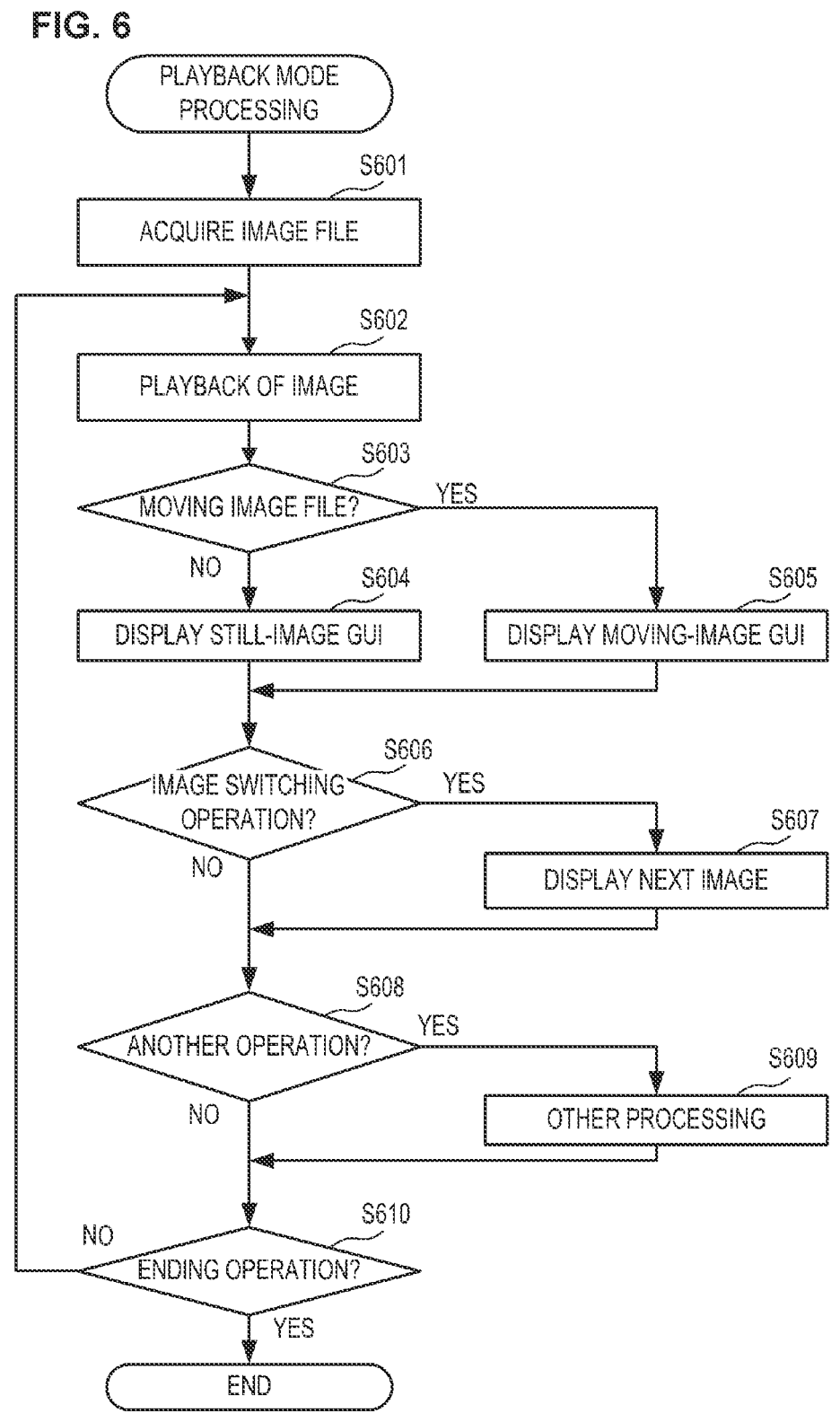

```
            ┌────────────────────────┐
            │   PLAYBACK MODE        │
            │   PROCESSING           │
            └───────────┬────────────┘
                        │        S601
            ┌───────────▼────────────┐
            │   ACQUIRE IMAGE FILE   │
            └───────────┬────────────┘
                        │        S602
            ┌───────────▼────────────┐
            │   PLAYBACK OF IMAGE    │
            └───────────┬────────────┘
                        │        S603
                     ◇──▼──────◇  YES
            │  MOVING IMAGE FILE? ├──────────────────┐
                     ◇─────────◇                     │
                        │ NO        S604             │          S605
            ┌───────────▼────────────┐    ┌──────────▼──────────────┐
            │ DISPLAY STILL-IMAGE GUI│    │ DISPLAY MOVING-IMAGE GUI│
            └───────────┬────────────┘    └──────────┬──────────────┘
                        │◄──────────────────────────┘
                        │        S606
                     ◇──▼──────◇  YES
            │  IMAGE SWITCHING   ├──────────────────┐
            │  OPERATION?        │                  │        S607
                     ◇─────────◇         ┌──────────▼──────────┐
                        │ NO             │  DISPLAY NEXT IMAGE │
                        │◄───────────────┴─────────────────────┘
                        │        S608
                     ◇──▼──────◇  YES
            │  ANOTHER OPERATION? ├─────────────────┐
                     ◇─────────◇                    │        S609
                        │ NO             ┌──────────▼──────────┐
                        │                │  OTHER PROCESSING   │
                        │◄───────────────┴─────────────────────┘
                        │        S610
          NO         ◇──▼──────◇
        ┌────────────┤ ENDING OPERATION? │
        │            ◇─────────◇
        │               │ YES
        │   ┌───────────▼────────────┐
        │   │         END            │
        │   └────────────────────────┘
        └──► (back to S602)
```

701 SWITCH MODE STILL IMAGE MOVING IMAGE

702 ASPECT MARKER SETTINGS...

703 RANGE DISPLAY SETTINGS LINES ONLY MASK

704 AF AREA SINGLE-POINT FULL-RANGE

705 TRACKING TRACKING NO TRACKING

ASPECT MARKER SETTINGS

702a NO DISPLAY 702b 1:1

702c 4:5

702d 5:4

702e 9:16

702f 2.35:1

ELECTRONIC DEVICE CAPABLE OF CONTROLLING PROCESSING IN DIFFERENT DIVIDED IMAGE REGIONS IN DIFFERENT SHOOTING MODES, AND CONTROL METHOD OF ELECTRONIC DEVICE

CROSS-REFERENCE TO RELATED APPLICATIONS

This application is a Continuation of International Patent Application No. PCT/JP 2022/019861, filed May 10, 2022, which claims the benefit of Japanese Patent Application No. 2021-121504, filed Jul. 26, 2021, both of which are hereby incorporated by reference herein in their entirety.

BACKGROUND OF THE INVENTION

Field of the Invention

The present invention relates to an electronic device, and more particularly relates to an electronic device that has an image-capturing unit.

Background Art

Displaying assisting lines (aspect markers) on an image (live view image) displayed on a display unit of a digital camera or a smartphone, to divide the image into regions when shooting still images or moving images, is known. Aspect markers give users, when shooting, a general indication of a range for performing trimming editing of images.

PTL 1 discloses technology for displaying aspect markers appropriate for each of a still-image mode and a moving-image mode. Also, PTL 2 describes technology regarding an electronic camera that is capable of simultaneously recording still images and moving images (two images), in which an icon indicating an image that is to remain as a record out of the still image and the moving image, and a guide frame indicating a shooting range for each of the images, are displayed together. According to this technology, the user can perform shooting while viewing assisting lines or a GUI that are appropriately displayed in accordance with a desired type of image (e.g., one of still image and moving image, or the like).

Meanwhile, there are cases in which when particular processing related to shooting (e.g., AF or AE) is performed, the user does not desire to perform the particular processing in one of a plurality of regions created through dividing the image by aspect markers. For example, in a case of shooting a still image, the user may not desire to execute AF in a region far away from the center of the image, out of the regions created through the dividing the image by the aspect markers.

CITATION LIST

Patent Literature

PTL 1 Japanese Patent Application Publication No. 2016-123033
PTL 2 Japanese Patent Application Publication No. 2012-160966

SUMMARY OF THE INVENTION

Accordingly, an object of the disclosure of technology is to provide an electronic device that enables a range that the user desires to be subjected to particular processing relating to shooting.

One aspect of the present invention is an electronic device capable of switching between a first mode for shooting a first type of image and a second mode for shooting a second type of image that is different from the first type of image, the electronic device including at least one memory and at least one processor which function as: a setting unit configured to set a division setting for division of an image in accordance with a user operation; a display control unit configured to perform control to display, on a display unit, a first assisting line that divides a region of the image on a basis of the division setting set by the setting unit, with the first assisting line being superimposed on the image, and configured to perform control to display the first assisting line superimposed on the image in accordance with one division setting set by the setting unit regardless of which of the first mode or the second mode; and a control unit configured to perform control such that, in the first mode, particular processing relating to shooting is inexecutable in a first region out of at least two regions created through dividing the image by the first assisting line, and the particular processing is executable in a second region out of the two regions, and perform control such that, in the second mode, the particular processing is executable in a region including the first region and the second region.

Further features of the present invention will become apparent from the following description of exemplary embodiments with reference to the attached drawings.

BRIEF DESCRIPTION OF THE DRAWINGS

FIG. 6 is a flowchart of playback mode processing according to the present embodiment.

DESCRIPTION OF THE EMBODIMENTS

In an electronic device that displays aspect markers (assisting lines), in a case of performing particular processing relating to shooting, there are cases in which a user does not desire to perform the particular processing in one of a plurality of regions into which aspect markers have divided an image. Conversely, in particular cases, there are cases in which the user desires to perform particular processing in a region including the plurality of regions into which the aspect markers have divided the image.

For example, a case will be assumed in which the user desires to upload a moving image that has been shot to a plurality of SNSs. Specifically, there is a case where the user desires to upload, with respect to a single moving image file, the moving image in a 16:9 aspect ratio to a first SNS as a main feature moving image, and the moving image in a 1:1 aspect ratio to a second SNS as an advertisement moving image. In this case, the user will expect various types of image-capturing functions, such as AF, AE, and so forth, to be executed in the range of the aspect ratio for the main feature moving image (16:9). However, there are situations in such cases where efficient moving image production cannot be performed due to execution areas of such image-capturing functions being restricted depending on the positions of the aspect markers (e.g., AF being executed only in one of regions into which division has been performed by the aspect markers) and so forth.

Accordingly, an electronic device that enables particular processing relating to shooting to be performed in ranges desired by the user will be described by way of an embodiment below.

EMBODIMENT

<External View of Digital Camera 100>

Figure 1A:
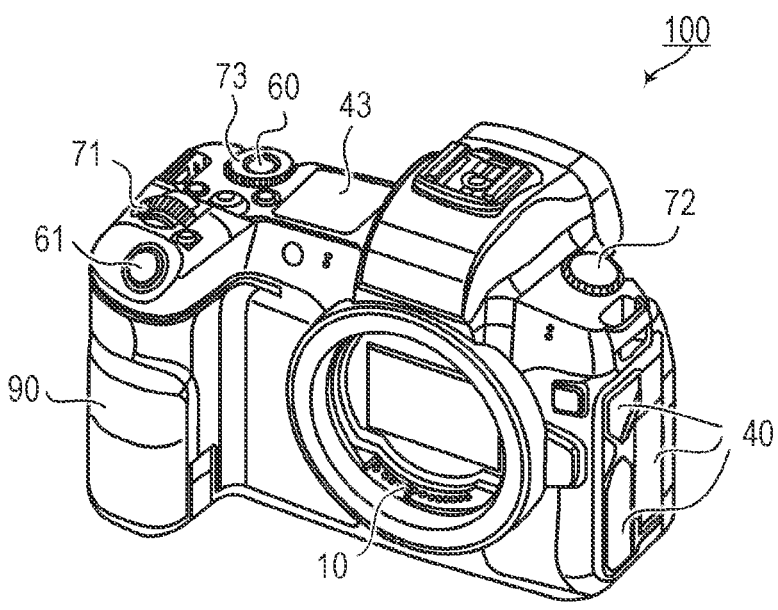
FIG. 1A and FIG. 1B are external views of a digital camera according to the present embodiment.
Figure 1B:
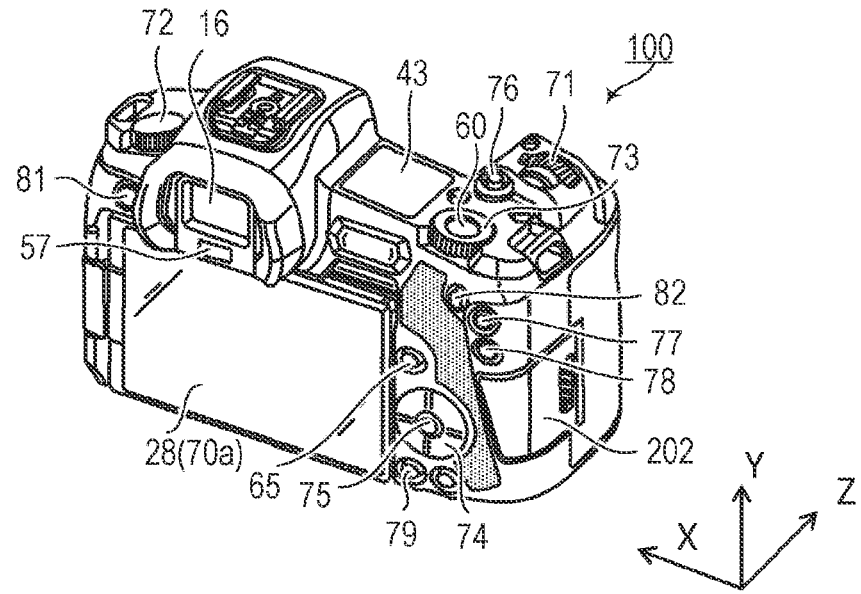

A preferred embodiment of the present will be described below with reference to the drawings. FIG. 1A and FIG. 1B illustrate an external view of a digital camera 100 serving as an example of a device to which the present invention is applicable. FIG. 1A is a frontal perspective view of the digital camera 100, and FIG. 1B is a rear perspective view of the digital camera 100.

A display unit 28 is a display unit provided on a rear face of the digital camera 100, and displays images and various types of information. A touch panel 70a is capable of detecting touch operations performed on a display face (touch operation face; touch operating member) of the display unit 28. A non-viewfinder display unit 43 is a display unit provided on an upper face of the digital camera 100, and displays various types of setting values for the digital camera 100, such as shutter speed and aperture. A shutter button 61 is an operating member for performing shooting instruction (image-capturing instruction). A mode-switching switch 60 is an operating member for switching various types of modes. Terminal covers 40 are covers that protect connectors (omitted from illustration) for connecting the digital camera 100 to external equipment.

A main electronic dial 71 is a rotational operating member, and rotation of the main electronic dial 71 enables setting values such as shutter speed, aperture, and so forth, to be changed and so forth. A power switch 72 is an operating member for switching the power of the digital camera 100 ON and OFF. A sub-electronic dial 73 is a rotational operating member, and rotation of the sub-electronic dial 73 enables movement of a selection frame (cursor), image feeding, and so forth, to be performed. A 4-directional key 74 is configured such that up, down, left, and right portions are each depressible, and is capable of processing corresponding to the portions of the 4-directional key 74 that are pressed. A SET button 75 is a pushbutton, and is primarily used for determination of selection items and so forth. A multi-controller (hereinafter, MC) 65 is capable of accepting direction instructions in eight directions, and depressing operations of a middle portion.

A moving image button 76 is used to instruct starting and stopping of shooting (recording) moving images. An AE lock button 77 is a pushbutton, and an exposure state can be fixed by pressing the AE lock button 77 in a shooting standby state. An enlarge button 78 so am operating button for switching between ON and OFF of an enlarge mode in live view display (LV display) in a shooting mode. Live view images (LV images) can be enlarged or reduced by turning the enlarge mode ON and thereafter operating the main electronic dial 71. In a playback mode, the enlarge button 78 functions as an operating button for increasing playback images, increasing enlargement scale, and so forth. A playback button 79 is an operating button for switching between the shooting mode and the playback mode. Pressing the playback button 79 while in the shooting mode transitions to the playback mode, and the newest image out of images recorded in a recording medium 200 (described later) can be displayed on the display unit 28. A menu button 81 is a pushbutton used to perform instruction operations for displaying a menu screen, and upon the menu button 81 being pressed, a menu screen from which various types of settings can be made is displayed on the display unit 28. The user can intuitively perform various types of settings using the menu screen displayed on the display unit 28, and the 4-directional key 74, the SET button 75, and the MC 65. A line-of-view finalizing button 82 is an operating member included in an operating unit 70 and is a pushbutton for executing selection of a subject on the basis of a position of a line-of-view pointer that will be described later, or instructing cancellation thereof. The line-of-view finalizing button is disposed at a position that is easy to operate even in a state in which the user is looking through a viewfinder (in a state in which the eye is in the proximity of an eyepiece 16), and is disposed at a position so as to be operable by the thumb of the right hand holding a grip portion 90.

A communication terminal 10 is a communication terminal for the digital camera 100 to perform communication with a lens unit 150 (described later; detachably attachable) side. The eyepiece 16 is an eyepiece of an ocular viewfinder (peephole-type viewfinder), and the user can visually recognize images displayed on an internal EVF 29 (described later) via the eyepiece 16. An eye proximity sensing unit 57 is an eye proximity sensing sensor that senses whether or not the eye of the user (photographer) is in the proximity of the eyepiece 16. A lid 202 is a lid of a slot that stores the recording medium 200 (described later). The grip portion 90 is a holding portion that has a shape that is easy to grip with the right hand when the user holds the digital camera 100 to shoot. In a state in which the digital camera 100 is held by gripping the grip portion 90 with the small finger, the ring finger, and the middle finger of the right hand, the shutter button 61 and the main electronic dial 71 are disposed at positions so as to be operable by the index finger of the right hand. Also, in this same state, the sub-electronic dial 73 and the line-of-view finalizing button 82 are disposed at positions so as to be operable by the thumb of the right hand.

<Configuration Block Diagram of Digital Camera 100>

Figure 2:
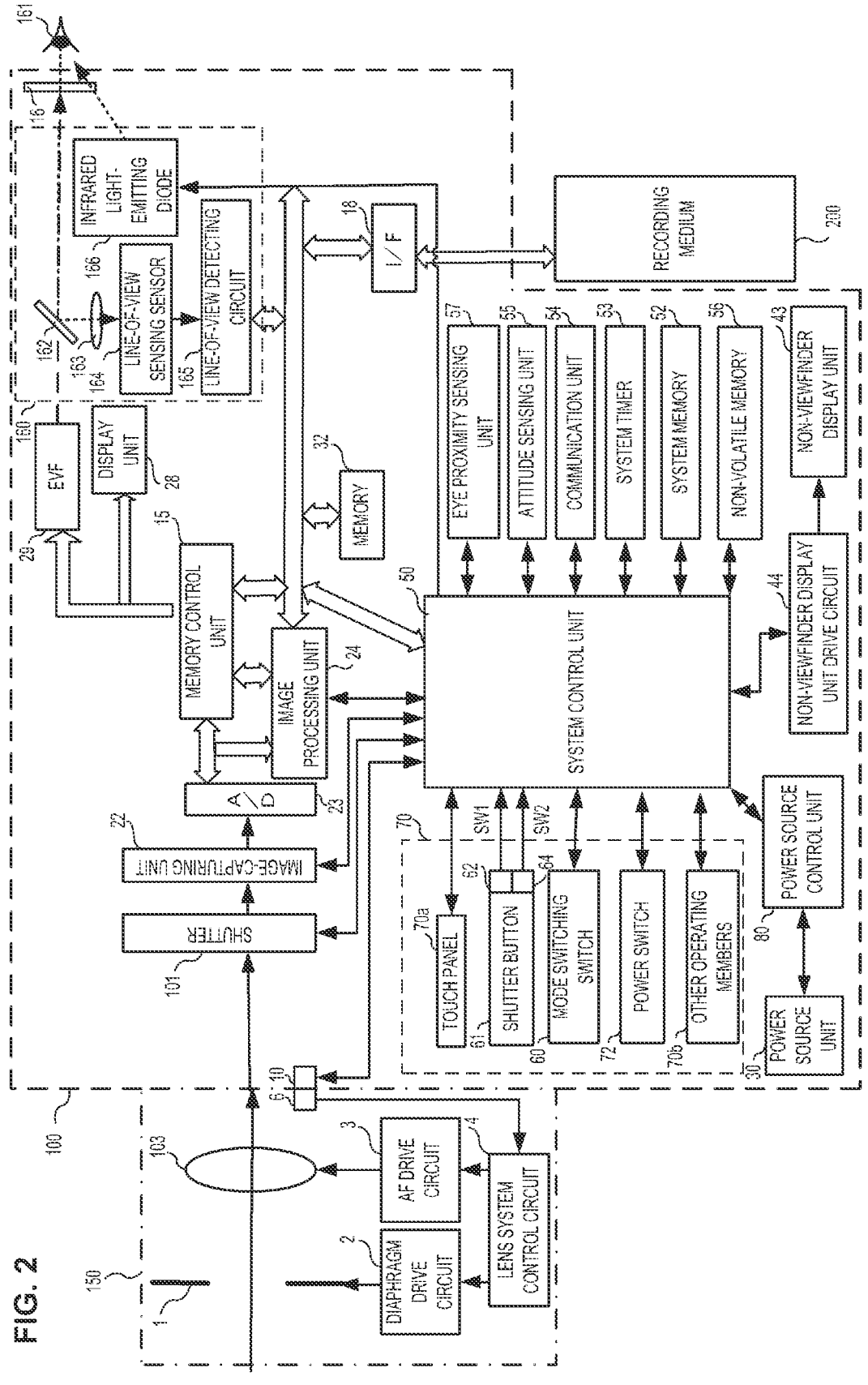
FIG. 2 is a configuration diagram of the digital camera according to the present embodiment.

FIG. 2 is a block diagram illustrating a configuration example of the digital camera 100. The lens unit 150 is a lens unit in which a shooting lens, which is replaceable, is mounted. A lens 103 is usually made up of a plurality of lenses, but in FIG. 2 is simplified and depicted as a single lens alone. A communication terminal 6 is a communication terminal for the lens unit 150 to perform communication with the digital camera 100 side, and the communication terminal 10 is a communication terminal for the digital camera 100 to perform communication with the lens unit 150 side. The lens unit 150 communicates with a system control unit 50 via these communication terminals 6 and 10. The lens unit 150 then performs control of a diaphragm 1 by a lens system control circuit 4 that is built in internally, via a diaphragm drive circuit 2. Also, the lens unit 150 performs focusing by displacing the lens 103 by the lens system control circuit 4 via an AF drive circuit 3.

A shutter 101 is a focal plane shutter that can freely control exposure time of an image-capturing unit 22 under control of the system control unit 50.

The image-capturing unit 22 is an image-capturing device that is made up of a CCD or CMOS device that converts optical images into electrical signals. The image-capturing unit 22 may have an image-plane phase-difference sensor that outputs defocus amount information to the system control unit 50.

An image processing unit 24 performs predetermined processing (resizing processing such as pixel interpolation and reduction, color conversion processing, and so forth) on data from an A/D converter 23 or data from a memory control unit 15. The image processing unit 24 also performs predetermined computation processing using the image data that has been image-captured, and the system control unit 50 performs exposure control and ranging control on the basis of computation results obtained from the image processing unit 24. Thus, TTL (through-the-lens) type AF (autofocus) processing, AE (autoexposure) processing, EF (flash pre-emission) processing, and so forth, are performed. The image processing unit 24 further performs predetermined computation processing using image data that has been image-captured, and performs TTL-type AWB (auto white balance) processing on the basis of computation results that are obtained.

The memory control unit 15 controls exchange of data among the A/D converter 23, the image processing unit 24, and memory 32. Output data from the A/D converter 23 is written to the memory 32 via the image processing unit 24 and the memory control unit 15. Alternatively, output data from the A/D converter 23 is written to the memory 32 via the memory control unit 15, without going through the image processing unit 24. The memory 32 stores image data that is obtained by the image-capturing unit 22 and converted into digital data by the A/D converter 23, and image data for display on the display unit 28 and the EVF 29. The memory 32 has sufficient storage capacity for storing a predetermined number of still images, and a predetermined amount of time of moving images and audio.

The memory 32 also doubles as memory for image display (video memory). Image data for display that is written to the memory 32 is displayed on the display unit 28 and the EVF 29 via the memory control unit 15. Each of the display unit 28 and the EVF 29 performs display on a display such as an LCD, organic EL, or the like, in accordance with signals from the memory control unit 15. Data that is A/D-converted by the A/D converter 23 and stored in the memory 32 is successively transferred to and displayed at the display unit 28 or the EVF 29, whereby live-view display (LV) can be performed. Hereinafter, images displayed in live-view display will be referred to as live-view images (LV images).

A line-of-view detecting unit 160 (accepting unit) detects a line of view of the eye of the user that is in the proximity of the eyepiece 16, viewing the EVF 29. The line-of-view detecting unit 160 is made up of a dichroic mirror 162, an imaging lens 163, a line-of-view sensing sensor 164, a line-of-view detecting circuit 165, and an infrared light-emitting diode 166.

The infrared light-emitting diode 166 is a light-emitting element for detecting a line-of-view position of the user in the viewfinder screen, and emits infrared light to an eyeball (eye) 161 of the user. The infrared light emitted from the infrared light-emitting diode 166 is reflected at the eyeball (eye) 161, and reflected infrared light thereof reaches the dichroic mirror 162. The dichroic mirror 162 reflects just the infrared light, and transmits visible light. The reflected infrared light, of which the optical path has been changed, is imaged on an image face of the line-of-view sensing sensor 164 via the imaging lens 163. The imaging lens 163 is an optical member that makes up a line-of-view sensing optical system. The line-of-view sensing sensor 164 is made up of an image-capturing device, such as a CCD-type image sensor or the like.

The line-of-view sensing sensor 164 performs optoelectrical conversion of the incident reflected infrared light into electrical signals, which are output to the line-of-view detecting circuit 165. The line-of-view detecting circuit 165 detects the line-of-view position of the user from the movement of the eyeball (eye) 161 of the user, on the basis of output signals from the line-of-view sensing sensor 164, and outputs detection information thereof to the system control unit 50 and a gaze determining unit 170.

In a case where a period in which the line of view of the user is fixed on a certain region exceeds a predetermined threshold value, the gaze determining unit 170 determines that the user is gazing at that region, on the basis of the detection information received from the line-of-view detecting circuit 165. Accordingly, this region can be said to be a gaze position that is a position on which gazing was performed (gaze region). Note that "the line of view is fixed on a certain region" means that, for example, an average position of movement of the line of view is within this region until a predetermined period elapses, and that variability (variance) is smaller than a predetermined value. Note that the predetermined threshold value can be optionally changed by the system control unit 50. Also, an arrangement may be made in which the gaze determining unit 170 is not provided as an independent block, and instead the system control unit 50 executes the same functions as the gaze determining unit 170 on the basis of the detection information received from the line-of-view detecting circuit 165.

In the present embodiment, the line-of-view detecting unit 160 detects the line of view using a method called the Purkinje method. The Purkinje method is a method in which the orientation and position of the line of view is detected from a positional relation between reflected light in which in infrared light emitted from the infrared light-emitting diode 166 is reflected at the eyeball (eye) 161 (particularly the cornea), and the pupil of the eyeball (eye) 161. Note that the method for detecting the line of view (the orientation and position of the line of view) is not limited in particular, and a method other than the above may be used. For example, a method called the scleral reflection method, in which difference in reflectance of light between the iris and the sclera is utilized, may be used.

The non-viewfinder display unit 43 displays various setting values of the camera, such as shutter speed and aperture, via a non-viewfinder display unit drive circuit 44.

Non-volatile memory 56 is memory that is electrically erasable/recordable, such as Flash-ROM or the like, for example. Recorded in the non-volatile memory 56 are constants, programs, and so forth, for the system control unit 50 to perform actions. Programs as referred to here are programs for executing various types of flowcharts which will be described later in the present embodiment.

The system control unit 50 is a control unit made up of at least one processor or circuit, and controls the entire digital camera 100. The system control unit 50 executes the programs stored in the non-volatile memory 56 described above, thereby realizing each type of the processing according to the present embodiment that will be described later. System memory 52 is RAM for example, and the system control unit 50 loads to the system memory 52 constants, variables, programs read from the non-volatile memory 56, and so forth, for the system control unit 50 to perform actions. The system control unit 50 also performs display control by controlling the memory 32, the display unit 28, and so forth.

A system timer 53 is a clocking unit for measuring time used for various types of control, and time of a built-in clock.

A power source control unit 80 is made up of a battery detecting circuit, a DC-to-DC converter, a switch circuit that switches blocks to apply electricity to, and so forth, and performs detection of whether or not a battery is mounted, the type of the battery, remaining charge of the battery, and so forth. The power source control unit 80 controls the DC-to-DC converter on the basis of detection results thereof, and instructions of the system control unit 50, so as to supply necessary voltage to various parts including the recording medium 200, for a necessary period. A power source unit 30 is made up of a primary battery (alkali battery, lithium battery, or the like), a secondary battery (NiCd battery, NiMH battery, Li battery, or the like), an AC adapter, or the like.

A recording medium I/F 18 is an interface to the recording medium 200, such as a memory card, a hard disk, or the like. The recording medium 200 is a recording medium such as a memory card or the like for recording images that are shot, and is made up of semiconductor memory, a magnetic disk, or the like.

A communication unit 54 exchanges image signals and audio signals with external equipment connected wirelessly or by a wired cable. The communication unit 54 is capable of connection to a wireless LAN (Local Area Network) and the Internet, as well. The communication unit 54 is also capable of communication with external equipment by Bluetooth (registered trademark) and Bluetooth Low Energy as well. The communication unit 54 is capable of transmitting images image-captured by the image-capturing unit 22 (including LV images) and images recorded in the recording medium 200, and is capable of receiving image data and various types of other information from external equipment as well.

An attitude sensing unit 55 senses attitude of the digital camera 100 with respect to the gravitational direction. Whether an image shot by the image-capturing unit 22 is an image shot holding the digital camera 100 level or an image shot holding the digital camera 100 on edge can be distinguished on the basis of the attitude sensed by the attitude sensing unit 55. The system control unit 50 is capable of adding orientation information corresponding to the attitude sensed by the attitude sensing unit 55 to an image file of the image that is image-captured by the image-capturing unit 22, recording the image in a rotated state, and so forth. An acceleration sensor, gyro sensor, or the like can be used as the attitude sensing unit 55. Movement (panning, tilting, lifting, whether still or not, and so forth) of the digital camera 100 can be sensed using the acceleration sensor, the gyro sensor, or the like, serving as the attitude sensing unit 55.

The eye proximity sensing unit 57 is an eye proximity sensing sensor that senses (proximity sensing) approaching (proximity) and distancing (non-proximity) of the eye (object) 161 with respect to the eyepiece 16 of the ocular viewfinder (hereinafter written simply as "viewfinder"). The system control unit 50 switches display (displayed state)/non-display (non-displayed state) of the display unit 28 and the EVF 29 in accordance with a state sensed by the eye proximity sensing unit 57. More specifically, in a case of at least a shooting standby state, in which switching of a display destination is set to automatic switching, the display of the display unit 28 is set to on to serve as the display destination when in non-proximity, and the EVF 29 is set to off. Also, the display of the EVF 29 is set to on to serve as the display destination when in proximity, and the display unit 28 is set to off. An infrared proximity sensor, for example, can be used as the eye proximity sensing unit 57, and can sense some sort of object approaching the eyepiece 16 of the viewfinder in which the EVF 29 is built in. In a case of an object approaching, infrared rays cast from a light casting unit (omitted from illustration) of the eye proximity sensing unit 57 are reflected at the object and received by a light receiving unit (omitted from illustration) of the infrared proximity sensor. The distance from the eyepiece 16 to which the object is approaching (proximity distance) can also be distinguished by the amount of infrared rays received. Thus, the eye proximity sensing unit 57 performs proximity sensing of sensing the distance of approach of the object to the eyepiece 16. In a case where an object is detected approaching within a predetermined distance from the eyepiece 16, from a non-proximity state (non-approached state), detection of proximity is made. In a case where the object of which approaching was detected is distanced by a predetermined distance or more, from a proximity state (approached state), detection of non-proximity is made. A threshold value for detecting proximity, and a threshold value for detecting non-proximity may differ from each other, with a hysteresis provided therebetween or the like, for example. Also, following detection of proximity, the proximity state continues until non-proximity is detected. Following detection of non-proximity, the non-proximity state continues until proximity is detected. Note that the infrared proximity sensor is an example, and other sensors may be employed as the eye proximity sensing unit 57 as long as it is capable of detecting approach of the eye or an object that can be deemed to be proximity thereof.

The system control unit 50 can detect the following states of the line of view as to the EVF 29 by controlling the line-of-view detecting unit 160.

That the line of view that had not been directed toward the EVF 29 is newly directed toward the EVF 29. That is to say, start of input of the line of view.

That in the current state there is input of the line of view to the EVF 29.

That a certain position of the EVF 29 is being gazed at.

That the line of view that had been directed toward the EVF 29 has been diverted. That is to say, end of input of the line of view.

A state in which there is no input of line of view to the EVF 29 (state of not watching the EVF 29).

These operations and states, and position (orientation) of line of view being directed to the EVF 29, are notified to the system control unit 50 through an internal bus, and the system control unit 50 determines what sort of input of line of view is being performed, on the basis of the information that is notified thereto.

The operating unit 70 is an input unit that accepts operations from the user (user operations), and is used to input various types of action instructions to the system control unit 50. As illustrated in FIG. 2, the operating unit 70 includes the mode-switching switch 60, the shutter button 61, the power switch 72, the touch panel 70a, and so forth. The operating unit 70 also includes, as other operating members 70*b*, the main electronic dial 71, the sub-electronic dial 73, the 4-directional key 74, the SET button 75, the moving image button 76, the AE lock button 77, the enlarge button 78, the playback button 79, the menu button 81, the MC 65, and so forth.

The mode-switching switch 60 switches the operation mode of the system control unit 50 to one of a still-image shooting mode, a moving-image shooting mode, a playback mode, or the like. Modes included in the still-image shooting mode are an auto-shooting mode, an auto-scene-distinguishing mode, a manual mode, an aperture-priority mode (Av mode), a shutter-speed-priority mode (Tv mode), and a program AE mode (P mode). There also are various types of scene modes that are different shooting settings for each shooting scene, custom modes, and so forth. The user can directly switch to one of these modes by the mode-switching switch 60. Alternatively, an arrangement may be made in which, following temporarily switching to a list screen of shooting modes by the mode-switching switch 60, another operating member is used to selectively switch to one of a plurality of the modes that are displayed. In the same way, the moving-image shooting mode may include a plurality of modes.

The shutter button 61 includes a first shutter switch 62 and a second shutter switch 64. The first shutter switch 62 goes ON partway through operation of the shutter button 61, at a so-called half-press (shooting preparation instruction), and generates a first shutter switch signal SW1. The first shutter switch signal SW1 causes the system control unit 50 to start shooting preparation actions such as AF (autofocus) processing, AE (autoexposure) processing, AWB (auto white balance) processing, EF (flash pre-emission) processing, and so forth. After operation of the shutter button 61 is completed, the second shutter switch 64 goes ON at a so-called full-press (shooting instruction), and generates a second shutter switch signal SW2. The second shutter switch signal SW2 causes the system control unit 50 to start a series of actions of shooting processing, from reading signals from the image-capturing unit 22 up to writing an image-captured image as an image file to the recording medium 200.

The touch panel 70*a* and the display unit 28 can be integrally configured. For example, the touch panel 70*a* is configured such that light transmittance thereof does not impede display on the display unit 28, and is attached to an upper layer of the display face of the display unit 28. Input coordinates of the touch panel 70*a* and display coordinates on the display face of the display unit 28 are then correlated. Thus, a GUI (graphical user interface) that works as if the screen displayed on the display unit 28 were directly operable by the user can be provided. The system control unit 50 can detect the following operations on the touch panel 70*a*, or states.

That a finger or a pen not touching the touch panel 70*a* has newly touched the touch panel 70*a*, i.e., starting of a touch (hereinafter referred to as touch-down (Touch-Down)).

A state in which the finger or the pen is touching the touch panel 70*a* (hereinafter referred to as touch-on (Touch-On)).

That the finger or the pen is moving while touching the touch panel 70*a* (hereinafter referred to as touch-move (Touch-Move)).

That the finger or the pen that was touching the touch panel 70*a* has departed from (been released from) the touch panel 70*a*, i.e., ending of a touch (hereinafter referred to as touch-up (Touch-Up)).

A state in which nothing is touching the touch panel 70*a* (hereinafter referred to as touch-off (Touch-Off)).

When touch-down is detected, touch-on is also detected at the same time. Following touch-down, normally, touch-on continues to be detected, as long as touch-up is not detected. Even in a case where touch-move is detected, touch-on is detected at the same time. Even when touch-on is being detected, touch-move is not detected as long as a touch position does not move. After touch-up of all fingers and pens that were touching is detected, touch-off is transitioned to.

These operations and states, and positional coordinates of the finger or pen touching the touch panel 70*a*, are notified to the system control unit 50 through the internal bus. The system control unit 50 then determines what sort of operations (touch operations) were performed on the touch panel 70*a*, on the basis of information that is notified thereto. With regard to touch-move, a movement direction of the finger or pen moving over the touch panel 70*a* can also be determined for each of the vertical component and the horizontal component on the touch panel 70*a*, on the basis of change in the positional coordinates. In a case where a touch-move of a predetermined distance or more having been performed is detected, determination is made that a slide operation has been performed. An operation in which the finger is quickly moved for just a certain distance while remaining in touch on the touch panel 70*a* and thereafter lifting the finger off, is called a flick. A flick is, in other words, an operation of quickly tracing over the touch panel 70*a* as if flicking with the finger. When a touch-move of a certain distance or more at a certain speed or more is detected, directly followed by detection of touch-up, a flick can be determined to have been performed (determination can be made that a flick was performed following a slide operation). Further, a touch operation of touching a plurality of places (e.g., two points) together (multi-touching), and bringing the touch positions closer to each other is called pinch-in, and a touch operation of distancing the touch positions from each other is called pinch-out. Pinch-out and pinch-in are collectively referred to as pinch operations (or simply pinching). The system of the touch panel 70*a* may be any of various types of systems for touch panels, such as a resistive film system, capacitive system, surface acoustic wave system, infrared system, electromagnetic induction system, image recognition system, optical sensor system, and so forth. Either system of a system for detecting touches in accordance with whether there was contact with the touch panel, and a system for detecting touches in accordance with whether there was approach of a finger or a pen to the touch panel may be employed.

Note that an audio input unit (omitted from illustration) that transmits audio to the system control unit 50 obtained from a microphone that is built in or from an audio input device connected via an audio input terminal may be provided to the digital camera 100. In this case, the system control unit 50 selects, as necessary, audio signals that are input, performs analog-to-digital conversion, performs processing of making the level appropriate, processing of reducing particular frequencies, and so forth, thereby generating audio signals.

In the present embodiment, the user can set the method by which the position of a position indicator (e.g., an AF frame) is specified to be, in a case where a touch-move operation is performed in a proximity state, either of an absolute position specification method or a relative position specification method. The absolute position specification method is a method in which the input coordinates on the touch panel 70a and the display coordinates on the display face of the EVF 29 are correlated. In the absolute position specification method, when there is touch-down on the touch panel 70a, the AF frame is set to a position correlated to the touched position (position of input coordinates) even without touch-move (moves from position prior to touch-down). A position set by the absolute position specification method is a position based on the position of touch-down, regardless of the position that was set prior to touch-down. Also, when there is touch-move after touch-down, the position of the AF frame moves on the basis of the touch position after the touch-move as well. The relative position specification method is a method in which the input coordinates on the touch panel 70a and the display coordinates on the display face of the EVF 29 are not correlated. In the case of the relative position specification method, the position of the AF frame does not move from the position prior to touch-down, in a state in which there only is touch-down to the touch panel 70a but there is no touch-move. When there is touch-move thereafter, the position of the AF frame moves from the position of the AF frame that is currently set (the position that was set prior to touch-down), by a distance corresponding to the amount of movement of the touch-move in the direction of movement of the touch mode, regardless of the position of the touch-down.

Note that regarding an AF area (setting method for AF frame), one of a plurality of AF methods including "single-point AF" and "full-range AF" can be set. Also, detection settings regarding a subject (tracking) can be set to performing tracking/performing no tracking. "Single-point AF" is a method in which the user specifies one place by a single-point AF frame, as the position for performing AF. "Full-range AF" is a method in which, in a case where there is no object of tracking specified by the user, the AF position is automatically set based on automatic selection conditions. Tracking settings can be reflected in these AF area settings by multiplication, and in a case where tracking is set to "perform tracking", the mode is such that when a face of a person is detected from the LV image, the face is selected as an AF-object subject with priority. In a case where a plurality of faces of people are detected, one face is selected following a priority such as the face with the largest size, the face of which the position is close to the digital camera 100 (on the near side), the face of which the position is closest to the middle within the image, the face of an individual registered in advance, or the like, and is set as the AF object subject. In a case where a face of a person is not detected, a subject other than a face is selected following a priority such as being close to the digital camera 100 (on the near side), contrast is high, being a subject with a high priority, such as an animal or a vehicle, being a moving body, or the like, and set as the AF object subject. In a case where a subject that is the object of tracking is specified by the user, the subject that is the object of tracking is set as the AF object subject. That is to say, automatic selection conditions are conditions in which weighting is performed using at least one element condition out of element conditions such as exemplified below, and that an obtained score is a predetermined threshold value or higher, or the obtained score is the highest.

A face of a detected person.
The size of the face is large.
The position of the face is close to the digital camera 100 (on the near side).
The position of the face is close to the middle within the image.
The face is of an individual registered in advance.

Close to the digital camera 100 (on the near side).
Contrast is high.
A subject with high priority, such as an animal, a vehicle, or the like.
A moving body.
[Camera Activation Processing]

Figure 3:
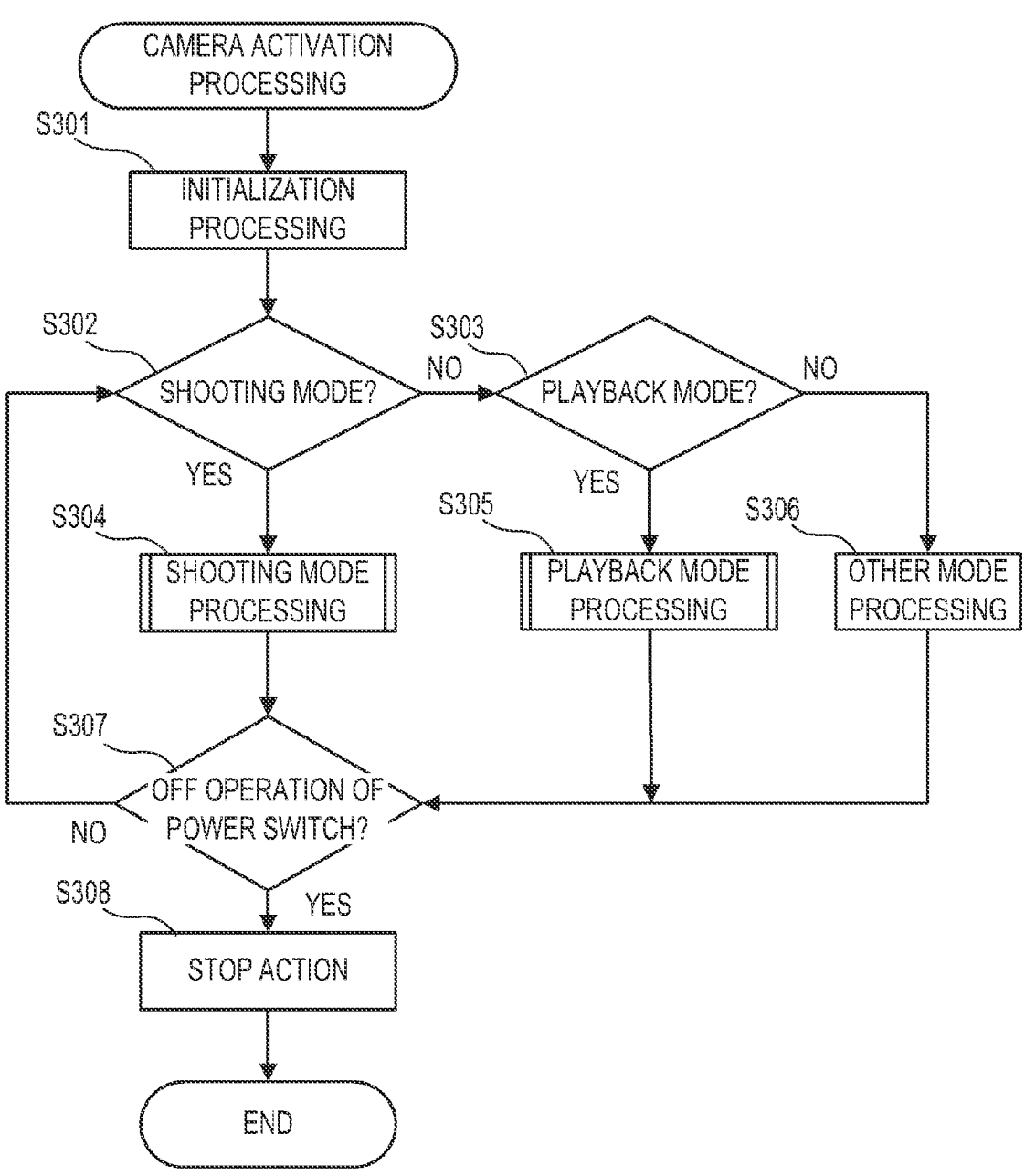
FIG. 3 is a flowchart of camera startup processing according to the present embodiment.

FIG. 3 is a flowchart of camera activation processing of the digital camera 100 according to the present embodiment. The processing of the flowchart in FIG. 3 is realized by the system control unit 50 loading to the system memory 52, and executing, a program stored in the non-volatile memory 56. Upon the digital camera 100 being activated in shooting mode in accordance with the power being operated to an on state by the power switch 72, flags, control variables, and so forth, are initialized, and the processing of the flowchart in FIG. 3 is started.

In S301, the system control unit 50 executes initialization processing and so forth of various types of flags, for camera activation processing.

In S302, the system control unit 50 determines whether or not the operation mode of the digital camera 100 is the shooting mode. In a case where the operation mode of the digital camera 100 is the shooting mode, the flow advances to S304, and otherwise, advances to S303.

In S303, the system control unit 50 determines whether or not the operation mode of the digital camera 100 is the playback mode. In a case where the operation mode of the digital camera 100 is the playback mode, the flow advances to S305, and otherwise, advances to S306.

In S304, the system control unit 50 performs shooting mode processing (see FIG. 4 and FIG. 5) which will be described later.

In S305, the system control unit 50 performs playback mode processing (see FIG. 6) which will be described later.

In S306, the system control unit 50 performs other mode processing. For example, the system control unit 50 performs processing of switching to a wireless communication mode, transmitting image files that are shot, to another device, and so forth.

In S307, the system control unit 50 determines whether or not an operation to turn the power switch 72 off (off operation) has been performed. In a case where the off operation of the power switch 72 has been performed, the flow advances to S308, and otherwise, advances to S302.

In S308, the system control unit 50 carries out storage of various types of flags for camera ending processing, and so forth, and stops actions of the digital camera 100.

The shooting mode processing in S304, and the playback mode processing in S305 in FIG. 3, will be described below with reference to the flowcharts in FIG. 4 to FIG. 6. First, the shooting mode processing in a case of the digital camera 100 performing shooting of a subject will be described with reference to FIG. 4 and FIG. 5. Thereafter, the playback mode processing in a case of the digital camera 100 performing playback of images that are shot will be described with reference to FIG. 6.

Also, hereinafter, description will be made assuming that the digital camera 100 has a still-image mode (mode for shooting still images) and a moving-image mode (mode for shooting moving images), as shooting modes. Also, in the present embodiment, the system control unit 50 displays a live view image on the display unit 28, and displays two aspect markers that divide the live view image into three regions, superimposed on the live view image. The live view image displayed on the display unit 28 is divided by two aspect markers into an inner-side region that is a region close to the middle of the image on the display unit 28, and two outer-side regions that are further away from the middle of the image than the inner-side region (see FIG. 8A). The two outer-side regions will be described below simply as outer-side regions, without any distinguishing therebetween. In the still-image mode, in a case of performing shooting, the digital camera 100 records only the inner-side region out of the regions into which the live view image is divided by the aspect markers. In the moving-image mode, in a case of performing shooting, the digital camera 100 records both regions of the inner-side region and the outer-side regions.

In a case of shooting moving images, shooting many times in accordance with the situation of the subject is difficult, from the perspective of shooting time and the perspective of file size, as compared to a case of shooting still images. Accordingly, in a case of the user shooting a moving image, there is demand for retaining image materials for a plurality of objects in a single shoot. Accordingly, in a case of shooting a moving image in the moving-image mode, the user often is assumed to perform recording also including the outer-side regions obtained by dividing the image by assisting lines such as aspect markers or the like.

Conversely, in a case of shooting still images, redoing shooting many times in accordance with the situation of the subject is easy, as compared to a case of shooting moving images. Accordingly, in a case of shooting a still image, in the digital camera 100, the object of recording is kept only to the inner-side region, and particular processing relating to shooting (range of moving the AF frame and so forth) is also kept to the inner-side region. Also, this enables both the region that is the object of shooting and the region that is the object of AF to both be the inner-side region, and accordingly a situation in which the focus is set in a region other than the object of shooting in the still image after shooting, can be suppressed, and suitable still images can be obtained. Further, the region intended by the user is in focus at the time of shooting, and accordingly reduction in lead time for preparation in shooting still images can be realized.

[Shooting Mode Processing]

Figure 4:
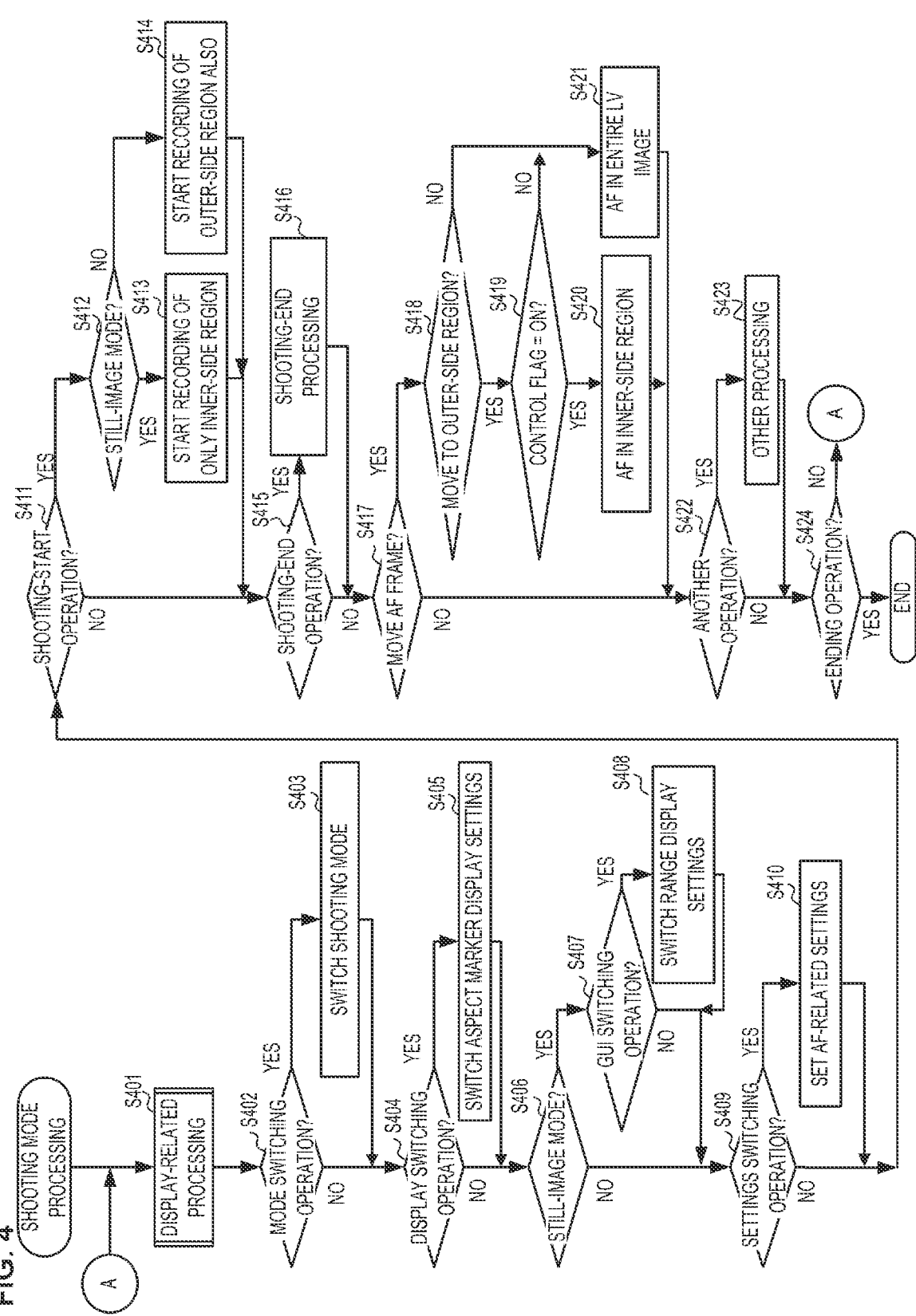
FIG. 4 is a flowchart of shooting mode processing according to the present embodiment.

FIG. 4 is a flowchart for describing primary processing in the shooting mode processing of the digital camera 100 according to the present embodiment (processing of S304). The processing of the flowchart in FIG. 4 is realized by the system control unit 50 loading to the system memory 52, and executing, a program stored in the non-volatile memory 56.

In S401, the system control unit 50 executes display-related processing which will be described later with reference to FIG. 5.

In S402 to S410, the system control unit 50 performs processing for changing various types of settings in the menu. In S402, the system control unit 50 determines whether or not mode-switching operations for switching the shooting mode (still-image mode and moving-image mode) are performed to the operating unit 70. In a case where mode-switching operations are performed, the flow advances to S403, and otherwise, advances to S404.

In S403, the system control unit 50 switches the shooting mode. Specifically, when the current shooting mode is the still-image mode, the system control unit 50 switches to the moving-image mode, and when the current shooting mode is the moving-image mode, switches to the still-image mode.

Figures 7A, 7B:
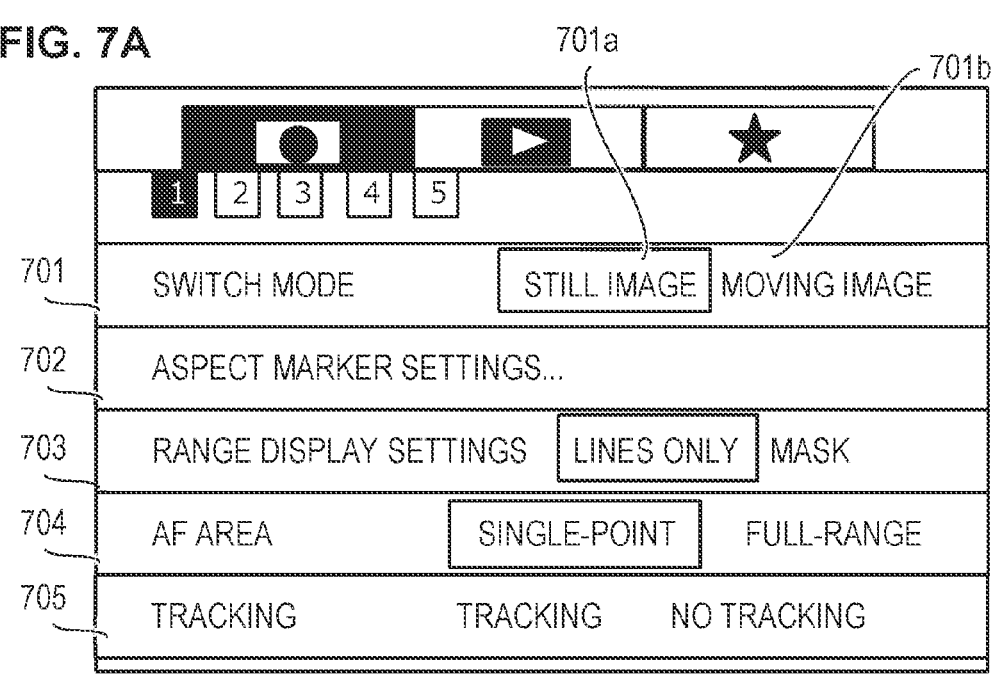
FIGS. 7A and 7B are diagrams for describing screens on a display unit according to the present embodiment.

FIG. 7A is an example of a first hierarchical level of a menu screen displayed on the display unit 28. In the first hierarchical level, the user can select a desired shooting mode by selecting one option from still image 701*a* (option representing still-image mode) and moving image 701*b* (option representing moving-image mode) in a mode-switching item 701. Accordingly, it can be said that a mode-switching operation is an operation for selecting an option representing a shooting mode that is not the current shooting mode. In response to the option selected by operations of the user at the operating unit 70, the system control unit 50 switches the shooting mode. With regard to the other items in the menu screen as well, the user can perform an operation of switching settings for the relevant items by selecting one from a plurality of options in the same way.

In S404, the system control unit 50 determines whether or not display-switching operations for switching aspect marker display settings are performed to the operating unit 70. Aspect marker display settings are settings of whether or not to display aspect markers, and an aspect ratio of the inner-side region in a case of displaying the aspect markers. In a case where display-switching operations are performed, the flow advances to S405, and otherwise, advances to S406.

For example, upon the user selecting aspect marker settings item 702 in FIG. 7A, the menu screen transitions from the screen of the first hierarchical level to a dedicated screen (screen of second hierarchical level) for selecting an option for the aspect markers, which is illustrated in FIG. 7B. In the example in FIG. 7B, an option 702*a* of not displaying the aspect markers, and options 702*b* to 702*f* to display aspect markers whereby the inner-side region is at a predetermined aspect ratio, are displayed in the dedicated screen. The user performs display switching operations by selecting one of the options 702*a* to 702*f*. The options 702*b* to 702*f* are options representing displaying the aspect markers such that the aspect ratio of the inner-side region is 1:1, 4:5, 5:4, 9:16, and 2.35:1, respectively. Note that an example of controlling aspect markers in accordance with display settings for aspect markers is described in the present embodiment, this is not limited to aspect markers. That is to say, any assisting lines relating to shooting (e.g., grid lines or the like) may be used instead of the aspect markers.

In S405, the system control unit 50 switches the aspect marker display settings in accordance with the display-switching operations (which of the options 702*a* to 702*f* has been selected).

In S406, the system control unit 50 determines whether or not the current shooting mode is the still-image mode. In a case where the current shooting mode is the still-image mode, the flow advances to S407, and otherwise (in a case where the current shooting mode is the moving-image mode), advances to S409.

In S407, the system control unit 50 determines whether or not GUI-switching operations, which are operations for switching range display settings, are performed to the operating unit 70. Range display settings are settings for a GUI display (display form) indicating the shooting range in a case of shooting still images. In a case where GUI-switching operations are performed, the flow advances to S408, and otherwise, advances to S409.

The user can perform GUI-switching operations by selecting one option of "lines only" and "mask" in an item 703 for range display settings in FIG. 7A. Specifically, the user can perform an operation to select "settings for representing shooting range by aspect markers alone" (line display settings) by selecting the "lines only" option. Conversely, the user can perform an operation to select "settings for, in addition to representing shooting range by aspect markers, representing by covering outer-side regions by masks" (mask display settings) by selecting the "mask" option. Note that the "mask" according to the present embodiment means a display that is superimposed on the live view image. A mask may be used in which the live view image becomes completely unviewable due to the mask display (mask transmittance of 0), or one having transmittance of a level where the live view image can be viewed.

In S408, the system control unit 50 switches the range display settings in accordance with the GUI-switching operations.

In S409, the system control unit 50 determines whether or not setting-switching operations for switching AF-related settings are performed to the operating unit 70. In a case where setting-switching operations are performed, the flow advances to S410, and otherwise, advances to S411.

In FIG. 7A, the user can perform setting-switching operations by selecting one of a plurality of AF methods including "single-point AF" and "full-range AF" from item 704 for the AF area. Also, the user can perform setting-switching operations by selecting whether or not to detect subjects from item 705 for tracking.

In S410, the system control unit 50 switches AF-related settings in accordance with the setting-switching operations.

In S411, the system control unit 50 determines whether or not shooting-start operations that are operations for starting shooting are performed to the operating unit 70. In a case where shooting-start operations are performed, the flow advances to S412, and otherwise, advances to S415.

In S412, the system control unit 50 determines whether or not the current shooting mode is the still-image mode. In a case where the current shooting mode is the still-image mode, the flow advances to S413. In a case where the current shooting mode is the moving-image mode, the flow advances to S414.

In S413, the system control unit 50 starts recording only the inner-side region of the live view image displayed on the display unit 28, as shooting-start processing for still images.

In S414, the system control unit 50 starts recording of the entire live view image displayed on the display unit 28, including not only the inner-side region but also the outer-side regions, as shooting-start processing for moving images.

In S415, the system control unit 50 determines whether or not shooting-end operations that are operations for ending shooting are performed at the operating unit 70. In a case where shooting-end operations are performed, the flow advances to S416, and otherwise, advances to S417.

In S416, the system control unit 50 performs the shooting-end processing. Shooting-end processing is, for example, processing for disposing recorded images in media in predetermined formats, processing for releasing buffers used at the time of shooting, and so forth. In S416, in a case of having performed shooting of still images in the still-image mode, the system control unit 50 stores the still images that are shot in the recording medium 200 as image files of still images (still image files). Conversely, in a case of having performed shooting of still images in the moving-image mode, the system control unit 50 stores the moving images that are shot in the recording medium 200 as image files of moving images (moving image files).

In S417, the system control unit 50 determines whether or not to move the AF frame. For example, in a case where "single-point AF" is set as the AF method, if an operation for moving the AF frame (AF frame moving operation) is performed, the system control unit 50 determines to move the AF frame. AF frame moving operation means a touch operation performed by the user on the touch panel 70a, an operation on any directional key of the 4-directional key 74, or the like. Conversely, in a case where "full-range AF" is set as the AF method, if a subject regarding which the AF frame is set in the live view image moves, the system control unit 50 determines to move the AF frame. In a case of moving the AF frame, the flow advances to S418, and otherwise, advances to S422.

In S418, the system control unit 50 determines whether or not the AF frame is trying to move to a position on the outer side of the aspect markers (outer-side region). For example, in a case where "single-point AF" is set as the AF method, if a position in the outer-side region is instructed by the AF frame moving operation, the system control unit 50 determines that the AF frame is trying to move to the outer-side region. Conversely, in a case where "full-range AF" is set as the AF method, if the subject regarding which the AF frame is set (e.g., the subject that is the object of tracking in which AF is continuously executed) moves to the outer-side region, the system control unit 50 determines that the AF frame is trying to move to the outer-side region. In a case where the AF frame is trying to move to the outer-side region, the flow advances to S419, and otherwise, advances to S421. Note that in a case where the processing of S418 is not executed and determination is made to move the AF frame in S417, the flow may advance to S419.

In S419, the system control unit 50 determines whether or not a flag for AF frame movement range limitation (limiting flag), which will be described later, is ON. In a case where the limiting flag is ON, the flow advances to S420, and otherwise, advances to S421. The limiting flag indicates whether movement (AF) of the AF frame is executable or inexecutable.

In S420, the system control unit 50 moves the AF frame and executes AF in the inner-side region. For example, in a case where "single-point AF" is set as the AF method, the system control unit 50 moves the AF frame to a position closest to the position instructed by the AF frame moving operation instruction, which is a position to which the AF frame can be moved to in the inner-side region, and executes AF at this position. Conversely, in a case where "full-range AF" is set as the AF method, the system control unit 50 executes AF only on the subject that is the object of tracking that is situated in the inner-side region.

In S421, the system control unit 50 moves the AF fame and executes AF over the entirety of the live view image including the inner-side region and the outer-side regions, regardless of the positions of the aspect markers. For example, in a case where "single-point AF" is set as the AF method, the system control unit 50 moves the AF frame to the position instructed by the AF frame moving operation instruction, and executes AF at this position. Conversely, in a case where "full-range AF" is set as the AF method, the system control unit 50 moves the AF frame to a position superimposed on the subject that is the object of tracking, in the entire live view image, and executes AF at this position. Note that in a case where determination is made in S418 that the AF frame is not trying to move to the outer-side regions, the AF frame does not move to the outer-side regions, and consequently, AF is executed only in the inner-side region in S421.

In S422, the system control unit 50 determines whether or not another operation has been made at the operating unit 70. If such another operation has been made, the flow advances to S423, and otherwise, advances to S424.

In S423, the system control unit 50 performs other processing in accordance with the other operation. Now, other operation and other processing here are, for example, operations for changing other parameters relating to shooting (shutter speed, exposure correction, and so forth), and processing based thereupon.

In S424, the system control unit 50 determines whether or not an ending operation for the shooting mode has been made at the operating unit 70. In a case where an ending operation for the shooting mode has been made, the processing of this flowchart ends, and otherwise, advances to S401. An ending operation corresponds to, for example, an operation for switching between shooting mode and playback mode, or the like.

[Display-Related Processing; S401]

Figure 5:
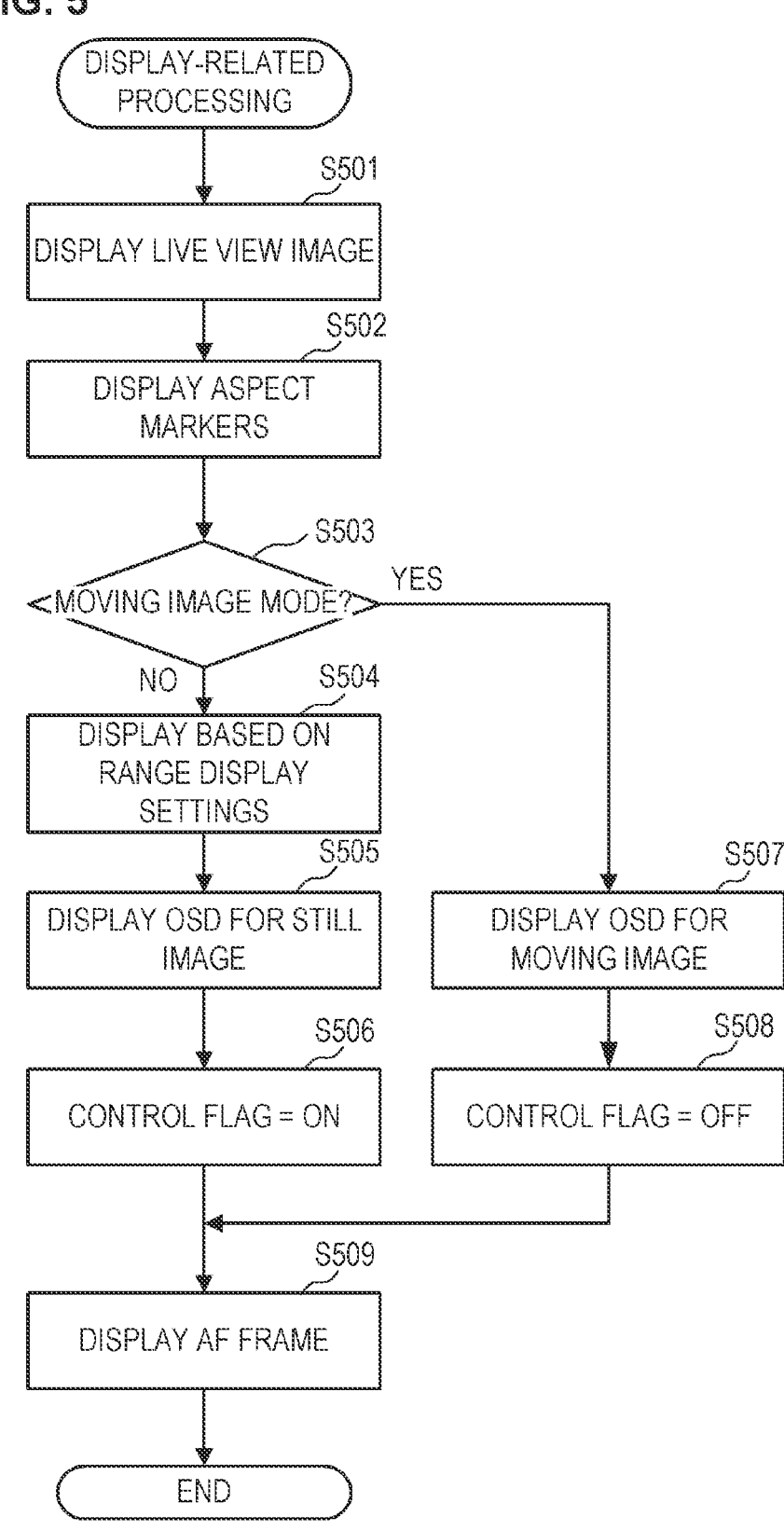
FIG. 5 is a flowchart of display-related processing according to the present embodiment.

FIG. 5 is a flowchart of display-related processing of the digital camera 100 according to the present embodiment. The processing of the flowchart in FIG. 5 is realized by the system control unit 50 loading to the system memory 52, and executing, a program stored in the non-volatile memory 56.

In S501, the system control unit 50 displays a live view image on the display unit 28, on the basis of signals sensed by the image-capturing unit 22.

In S502, the system control unit 50 displays the aspect markers on the display unit 28 in accordance with aspect marker display settings, so as to be superimposed on the live view image.

In S503, the system control unit 50 determines whether or not the current shooting mode is the still-image mode. In a case where the current shooting mode is the moving-image mode, the flow advances to S507, and otherwise, advances to S504.

Figures 8A, 8B:
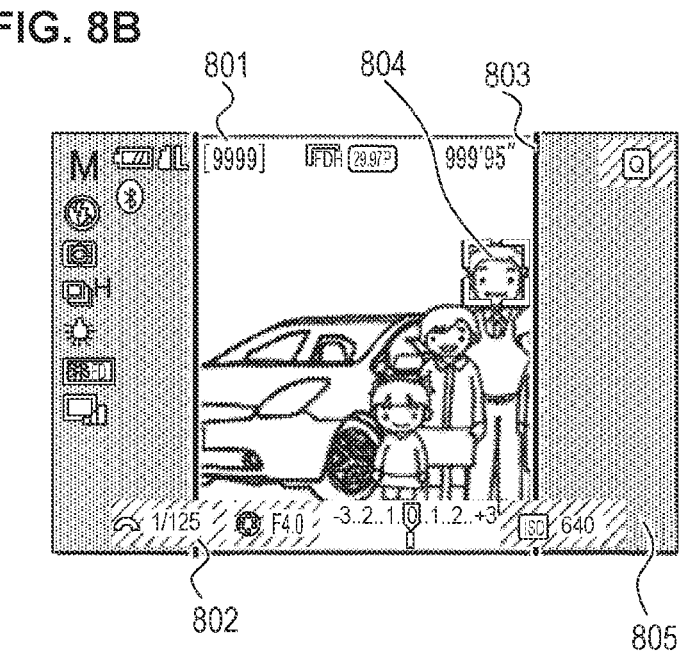
FIG. 8A to FIG. 8C are diagrams for describing screens for the shooting mode processing according to the present embodiment.

In S504, if the range display settings are mask display settings, the system control unit 50 displays masks superimposed on the outer-side regions on the display unit 28 (see FIG. 8B). Conversely, if the range display settings are line display settings, the system control unit 50 does not display the masks (see FIG. 8A).

In S505, the system control unit 50 displays an OSD for still images, superimposed on the live view image on the display unit 28, indicating information relating to the still-image mode, as with a still-image mode information display 802 in FIG. 8A. Information relating to the still-image mode includes, for example, information of the number of shots that can be taken, remaining battery charge, ISO speed, shutter speed, aperture number, and so forth.

In S506, the system control unit 50 sets the limiting flag (flag for AF frame movement range limitation) to ON. Accordingly, in the still-image mode, the AF frame moves only in the inner-side region, and AF is executed only in the inner-side region. That is to say, the system control unit 50 enables movement of the AF frame and execution of AF only in the inner-side region, and disables movement of the AF frame and execution of AF in the outer-side regions.

Figure 9A:
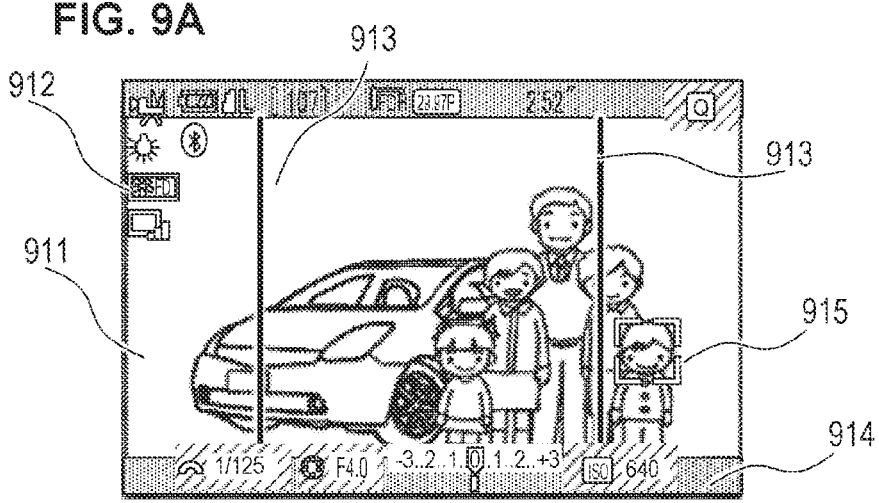
FIG. 9A to FIG. 9C are diagrams for describing screens for the shooting mode processing according to the present embodiment.

In S507, the system control unit 50 displays an OSD for moving images, superimposed on the live view image on the display unit 28, indicating information relating to the moving-image mode, as with a moving-image mode information display 912 in FIG. 9A. Information relating to the moving-image mode includes, for example, information of the amount of time that shooting can be performed, remaining battery charge, ISO speed, aperture number, and so forth.

In S508, the system control unit 50 sets the limiting flag to OFF. Accordingly, in the moving-image mode, the AF frame moves over the entire region of the live view image, including the inner-side region and the outer-side regions, and AF is executed over the entire region of the live view image. That is to say, the system control unit 50 enables movement of the AF frame and execution of AF on the inner-side region and the outer-side regions.

In S509, the system control unit 50 superimposes the AF frame on the live view image on the basis of current AF-related settings, and performs display thereof on the display unit 28.

[Screen in Shooting Mode Processing]

FIG. 8A to FIG. 9C are screen examples in shooting mode processing of the digital camera 100 according to the embodiment.

FIG. 8A is a screen of the display unit 28 in the still-image mode. FIG. 8A is a screen at the point in time of ending the processing of S509, in a case where the shooting mode is the still-image mode (NO in S503) and the masks are not displayed in S504. FIG. 8A is a screen example in which the range display settings are the line display settings (settings in which only the aspect markers are displayed). In FIG. 8A, the still-image mode information display 802, aspect markers 803, and an AF frame 804, are displayed superimposed on a live view image 801. The aspect markers 803 hereinafter illustrate an example of aspect markers whereby the aspect ratio of the inner-side region is made to be 1:1. In the still-image mode, the limiting flag is ON, and accordingly the AF frame 804 is not displayed, and AF is not executed, on the outer side of the two aspect markers 803 (outer-side regions).

FIG. 8B is a screen example of the display unit 28 in a case where the range display settings are mask display settings (settings in which the masks are also displayed). FIG. 8B is a screen at the point in time of ending the processing of S509, in a case where the shooting mode is still-image mode (NO in S503) and the masks are displayed in S504. In FIG. 8B, masks 805 are displayed superimposed on the live view image 801, and only the live view image 801 on the inner side of the two aspect markers 803 is displayed. The example in FIG. 8B is advantageous in that the image after shooting can be readily imagined. Conversely, the example in FIG. 8A is advantageous in that the situation of subjects outside of the shooting range can be readily comprehended, and that the aspect ratio of the inner-side region can be readily changed (changing the positions of the aspect markers 803).

Figure 8C:
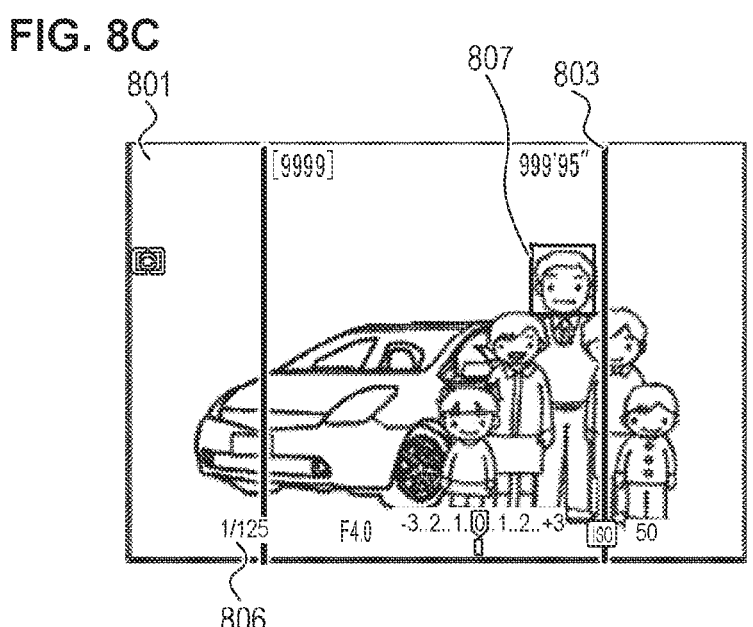

FIG. 8C is a screen example of the display unit 28 in a shooting preparation state in the still-image mode. FIG. 8C is a screen at the point in time of ending the processing of S423, in a case where the first shutter switch 62 has been operated as another operation in S422 with the screen in FIG. 8A displayed. In a case where the first shutter switch 62 has been operated, this shooting preparation state is transitioned to. In FIG. 8C, the live view image 801 and the aspect markers 803 are displayed in the same way as in FIG. 8A. Meanwhile, in FIG. 8C, an information display 806 in accordance with being in a shooting state (including the shooting preparation state), and a focusing frame 807 indicating results of executing AF, are also displayed. The limiting flag is ON in the still-image mode, and accordingly the focusing frame 807 is not displayed on the outer side of the aspect markers 803.

Note that when the second shutter switch 64 is operated in the state of the image illustrated in FIG. 8C being displayed and shooting is performed, an outer frame that is a frame drawn around the periphery of the live view image is displayed in a case where the user has made silent shutter settings. Silent shutter settings are settings for disabling the shutter sound when shooting. The outer frame is a frame for notifying the user of the shooting timing (that shooting is being performed), to solve a problem in which the shooting timing cannot be recognized due to the absence of the shutter sound.

FIG. 9A is an example of a screen of the display unit 28 in the moving-image mode. FIG. 9A is a screen at the point in time of ending the processing of S509, in a case where the shooting mode is the moving-image mode (YES in S503). In FIG. 9A a moving-image mode information display 912, aspect markers 913, masks 914, and an AF frame 915 are displayed superimposed on a live view image 911. In the moving-image mode, the limiting flag is OFF, and accordingly the AF frame 915 can be displayed in the outer-side regions (on the outer sides of the aspect markers 913).

Figure 9B:
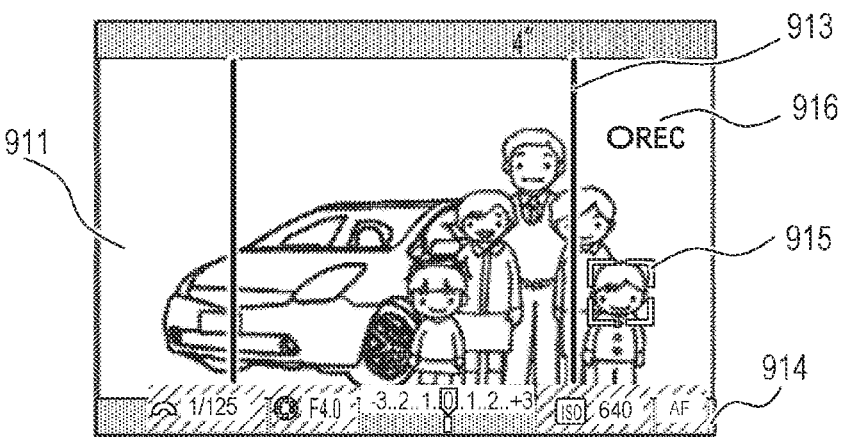

In a case where operations to start moving-image recording are made at the operating unit 70 from the state of the screen illustrated in FIG. 9A being displayed, the screen in FIG. 9B is transitioned to. That is to say, FIG. 9B is a screen at the point in time of ending the processing of S414, in a case where operations to start moving-image shooting are made with the screen of FIG. 9A displayed (case of YES in S411 and NO in S412). FIG. 9B is a screen example while recording moving images, and an information display 916 corresponding to the moving image recording state is displayed, unlike in FIG. 9A. In this case as well, the limiting flag is OFF, and accordingly the AF frame 915 can be displayed in the outer-side regions.

Figure 9C:
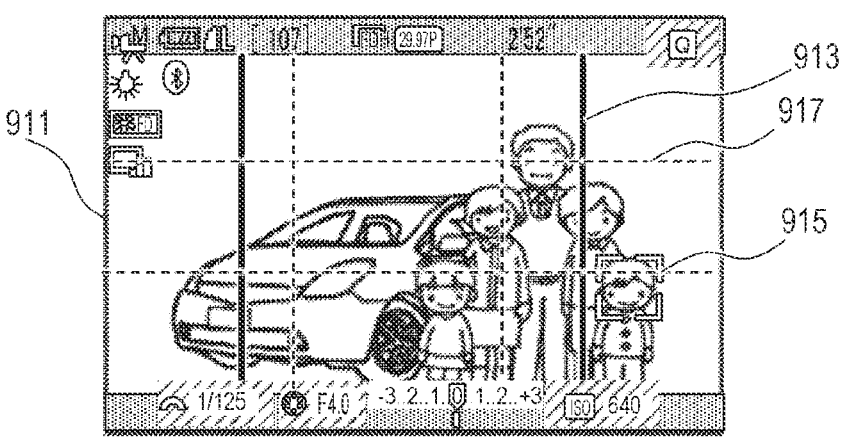

Note that the display unit 28 may display the aspect markers, and markers (assisting lines) other than the aspect markers at the same time. For example, as illustrated in FIG. 9C, the display unit 28 may display grid lines 917 for confirming the positions of the subjects in the live view image 911 at the same time as the aspect markers 913. In this case, the system control unit 50 does not have to limit movement of the AF frame in two regions created by division by the grid lines 917, regardless of the limiting flag. That is to say, the system control unit 50 may move the AF flag in a region including both of the two regions created by division by the grid lines 917 regardless of which shooting mode, and execute AF. Also, in a case where the inner-side region is divided into two or more regions by the grid lines 917, the system control unit 50 does not have to limit (to disable) movement of the AF frame (execution of AF) in the two or more regions, even in the still-image mode. That is to say, in a case where the inner-side region includes two or more regions created by division by the grid lines 917, the system control unit 50 may move the AF frame in the region including the two or more regions and execute AF, regardless of which shooting mode. Conversely, in a case where the outer-side regions include two or more regions created by division by the grid lines 917, the system control unit 50 may not move the AF frame in the region including the two or more regions and may not execute AF, if in the moving-image mode. Also, upon starting recording of a still image or a moving image (upon starting shooting), the system control unit 50 may hide the grid lines 917 from display.

Description has been made regarding control performed to limit movement of the AF frame (limiting of AF execution range) in accordance with the mode regarding an image including two regions created by division by assisting lines such as aspect markers or the like, with reference to FIG. 4 to FIG. 9C. According to such control, the user can acquire an image in which AF has been executed within the range of the image (moving image) that is to be used in the end, and the load of redoing shooting of the image (moving image) can be lessened.

FIG. 6 is a flowchart of playback mode processing of the digital camera 100 according to the present embodiment. The processing of the flowchart in FIG. 6 is realized by the system control unit 50 loading to the system memory 52, and executing, a program stored in the non-volatile memory 56.

In S601, the system control unit 50 acquires an image file stored in the recording medium 200.

In S602, the system control unit 50 performs playback of the image file that is acquired as an image on the display unit 28.

In S603, the system control unit 50 determines whether or not the image file acquired in S601 is a moving image file. In a case where the image file is a moving image file, the flow advances to S605, and otherwise, advances to S604.

In S604, the system control unit 50 displays information relating to the still image file, and a still-image GUI for performing operations regarding the still image file, superimposed on the image that is being played back, on the display unit 28.

Figure 10A:
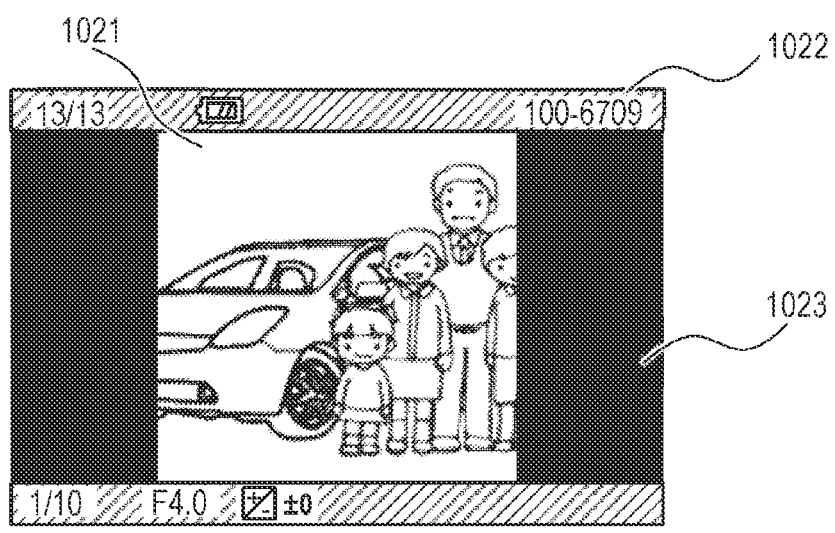
FIG. 10A and FIG. 10B are diagrams for describing screens for the playback mode processing according to the present embodiment.

FIG. 10A is a screen example of the display unit 28 illustrating a playback state of a still image. A still-image GUI 1022 is displayed superimposed on an image 1021 being played back. Also, the image 1021 being played back is an image file shot on the basis of settings setting the aspect ratio to 1:1 in S413, and accordingly blank regions 1023 that are not recorded are displayed on both sides of the image 1021.

In S605, the system control unit 50 displays information relating to the moving image file, and a moving-image GUI for performing operations regarding the moving image file, superimposed on the image that is being played back, on the display unit 28.

Figure 10B:
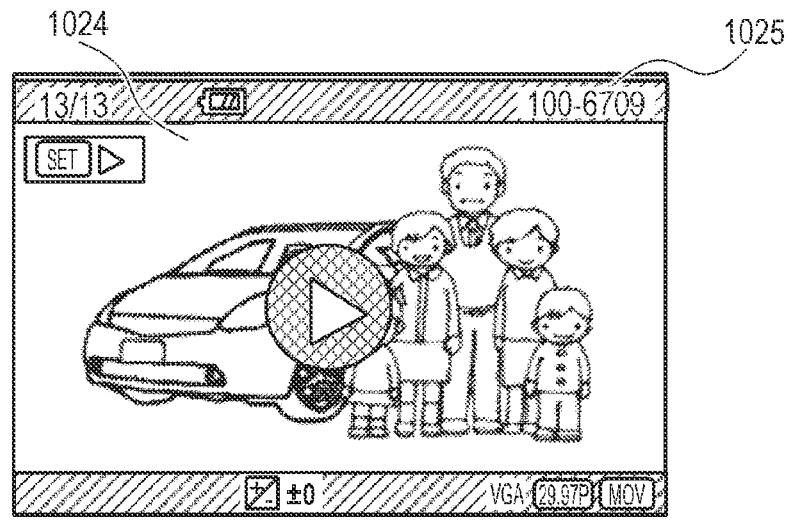

FIG. 10B is a screen example of the display unit 28 illustrating a playback state of a moving image. A moving-image GUI 1025 is displayed superimposed on an image 1024 being played back. Also, the image 1024 being played back is a file shot based on settings setting the aspect ratio of the inner-side region to 1:1 in S414. It can be seen from FIG. 10B that recording has been performed including the regions outside of the aspect markers (outer-side regions) as well.

In S606, the system control unit 50 determines whether or not an image switching operation for switching the image file displayed on the display unit 28 to a next file has been performed at the operating unit 70. In a case where an image switching operation has been performed, the flow advances to S607, and otherwise, advances to S608.

In S607, the system control unit 50 switches the image file displayed (played back) on the display unit 28 to the next file.

In S608, the system control unit 50 determines whether or not another operation has been performed at the operating unit 70. In a case where another operation has been performed, the flow advances to S609, and otherwise, advances to S610.

In S609, the system control unit 50 performs other processing. Now, other operation and other processing here is, for example, operations for changing other parameters relating to playback (playback speed, brightness of the display unit 28, and so forth), and processing based thereupon.

In S610, the system control unit 50 determines whether or not an ending operation for the playback mode processing has been performed at the operating unit 70. In a case where an ending operation for the playback mode processing has been performed, the processing of this flowchart ends. Otherwise, the flow advances to S602. An ending operation of the playback mode processing corresponds to, for example, an operation for switching between shooting mode and playback mode, or the like.

As described above, in a case where the user makes settings for displaying assisting lines such as aspect markers or the like, control is performed regarding whether to execute AF just in a region created by division by the assisting lines, or to execute AF outside of the region as well, in accordance with the shooting mode. In a case where settings are to display aspect markers, and the mode is the still-image mode, AF is executed in just the region on the inner side of the image divided by the aspect markers (within the region of the image of which the aspect ratio has been adjusted by the aspect markers). In a case of still images, there are cases in which the user does not use the regions outside of the assisting lines (aspect markers) when using the image that is shot. In such a case, if the image is one that is focused on a region outside of the assisting lines, there are cases in which there will be no focal position in the image on the inner side of the assisting lines that is to be used, and the image will be one that the user does not desire.

Conversely, in a case where settings are made to display the aspect markers and the mode is moving-image mode, the likelihood that the user will use the entire moving image that is shot, regardless of the positions of the aspect markers, is high. Accordingly, the system control unit 50 executes AF not only in the region on the inner side of the aspect markers, but also in the regions on the outer side. In the still-image mode there are cases in which the regions on the outer side of the aspect markers are not used, and accordingly it is conceivable that there will be little inconvenience even if AF is executed only in a range that is narrower than the image actually being image-captured. However, in the moving-image mode, only being able to execute AF in a range that is narrower than the moving image actually being image-captured means that focusing can only be performed in part of the range that can be image-captured, and the user will be greatly inconvenienced.

Accordingly, the system control unit 50 performs control to execute AF (focusing) only in the range of the image that the user is likely to use, in accordance with the shooting mode. Thus, the user will be able to execute AF, which is particular processing relating to shooting, for a desired range, in accordance with the situation.

Note that in the present embodiment, an example has been described in which the system control unit 50 sets the limiting flag (flag for AF frame movement range limitation) to ON in the still-image mode and sets the limiting flag to OFF in the moving-image mode, this is not limiting. Regardless of the shooting mode, the system control unit 50 may execute processing regarding whether or not to limit the range to execute AF in accordance with which of a mode to shoot only the inner-side region, and a mode to shoot the entire live view image, the mode is. Specifically, the system control unit 50 may set the limiting flag to ON in the mode to shoot only the inner-side region, and set the limiting flag to OFF in the mode to shoot the entire live view image. The mode to shoot only the inner-side region is a mode in which only the image within the two aspect markers (inner-side region) is recorded and kept, without including the outer-side regions. The mode to shoot the entire live view image is a mode in which the image including outside of the aspect markers as well, which is an image including the inner-side region and the outer-side regions, is recorded and kept.

Note that while an example of limiting the movement range of the AF frame has been described, this is not restrictive. The particular processing that is subjected to limitation may be AE, processing for setting (displaying) a center position of an enlarged display of a live view image (a center position in a case of performing enlarged display of a live view image), and processing for displaying a guide (focus guide) indicating the degree of focus (focal state) as to subjects. The particular processing may be processing for setting (displaying) a white acquisition position in manual white balance, or the like.

Note that, as described with reference to FIG. 9C, a form may be made in which assisting information other than aspect markers, such as assisting lines and so forth, is displayed at the same time. In this case, the system control unit 50 limits the movement range of the AF frame in accordance with the positions of the aspect markers, but the movement range of the AF frame may not be limited (enabling execution of movement of the AF frame regardless of the assisting information), or may be limited, in accordance with the other assisting information. For example, in a case of displaying a safety zone sectioned by assisting lines, the system control unit 50 may limit (disable execution of AF) the range of movement of the AF frame to the safety zone (execution of AF in the safety zone), even in the moving-image mode. That is to say, the system control unit 50 may not move the AF frame in the safety zone out of the two regions created by dividing by an assisting line to show the safety zone, so that AF is not executed, regardless of which shooting mode. A safety zone is assisting information indicating a range in which when, for instance, closed captions are inserted by editing, not all of them can be necessarily seen, assuming distribution on a plurality of media, such as PCs, and television.

Also, even in a case of displaying the aspect markers, the system control unit 50 may change whether or not to set the limiting flag to ON in accordance with the options (see FIG. 7B) of selecting the aspect ratio of the inner-side region. As described above, when the limiting flag is set to ON, the system control unit 50 moves the AF frame and executes AF only in the inner-side region. When the limiting flag is set to OFF, the system control unit 50 moves the AF frame and executes AF in a region including both regions of the inner-side region and the outer-side regions. For example, in a case of setting the aspect ratio of the inner-side region to 1:1, the system control unit 50 sets the limiting flag to OFF, assuming generating of a normal moving image of an aspect ratio of 16:9, and a moving image of 1:1 for posting on an SNS or the like. Conversely, in a case of setting the aspect ratio of the inner-side region to 2.35:1 (in a case of selecting aspect markers for movies), the system control unit 50 may set movement limitation of the AF frame to ON even in the moving-image mode, assuming that the only object is shooting the main feature of a movie.

Note that the system control unit 50 may set the limiting flag to OFF in a state in which a subject is selected by the user and that subject is tracked as a main subject, even in the still-image mode (in either shooting mode). Additionally, in a predetermined case, the system control unit 50 may set the limiting flag to OFF even in the still-image mode (in either shooting mode). A predetermined case is a case where a subject that has been authenticated and registered as an individual is indicated by the AF frame (a case where the object of AF is a subject registered in advance), or a case where AF-related settings assuming a moving subject have been set (SERVO or tracking). SERVO (continuous) is a setting in which, upon a predetermined condition being satisfied (e.g., the first shutter switch 62 being continuously pressed), the subject is tracked, and this subject continues to be in focus (focusing thereon is continued).

Further, the system control unit 50 may set the limiting flag to OFF in a case where the AF frame indicates something other than a person (a case where the object of particular processing is other than a person) even when in the still-image mode, since the likelihood of that object moving greatly is high. Also, in a state in which operation at a particular operating unit for instructing a position (e.g., the line-of-view detecting circuit 165) is enabled, the system control unit 50 may set the limiting flag to OFF even in the still-image mode. Thus, the user can specify a position in the entire live view image in either shooting mode.

Also, the system control unit 50 may set the limiting flag not in accordance with whether the still-image mode or the moving-image mode, but in accordance with which of a mode for shooting images of a subject that is stationary, or a mode for shooting images of a subject that is moving. For example, when in the mode for shooting images of a subject that is stationary, the system control unit 50 sets the limiting flag to ON. When in the mode for shooting images of a subject that is moving, the system control unit 50 sets the limiting flag to OFF. In the same way, in a case where the user has made settings for uploading to a particular SNS (e.g., SNS shooting mode is on), the system control unit 50 may set the limiting flag to on regardless of which mode of the still-image/moving-image mode. Further, in a case of the digital camera 100 connecting to the Internet and performing streaming distribution on a particular SNS, the system control unit 50 may set the limiting flag in accordance with a display format of the SNS to which uploading is to be performed. Depending on the SNS, there are those that are arranged for only the region on the inner side of the aspect markers (i.e., 1:1 region) to be visible to other users, and those that enable the regions on the outer side of the aspect markers (i.e., 16:9 region) to also be visible to other users. Accordingly, the system control unit 50 may perform communication with the SNS with which the digital camera 100 is going to perform uploading, via the communication unit 54, and recognize the SNS connected to the digital camera 100. The system control unit 50 may change the on/off settings of the limiting flag in accordance with the SNS that is recognized (display format of the SNS). Also, in a case where the user has specified a particular SNS, the system control unit 50 may change the settings for the limiting flag in accordance with the specified SNS, even without recognizing the SNS via the communication unit 54.

Also, although the aspect markers are represented by solid lines in the drawings, this is not restrictive. The aspect markers may be expressed by dotted lines or other expression methods. The system control unit 50 may impart the image file with information of the aspect markers displayed at the time of shooting, and display the aspect markers as OSD in the playback mode (during playback) as well.

Also, while the present invention has been described in detail by way of a preferred embodiment thereof, the present invention is not limited to these particular embodiments, and various forms made without departing from the spirit and scope of this invention are also encompassed by the present invention. Further, each of the above-described embodiments is only an embodiment of the present invention, and the embodiments may be combined as appropriate.

Note that the above-described various types of control, described as being performed by the system control unit 50, may be processing that is carried out by one piece of hardware, or that is shared among a plurality of pieces of hardware (e.g., a plurality of processors or circuits), thereby carrying out the control of the entire device.

Also, while the present invention has been described in detail by way of a preferred embodiment thereof, the present invention is not limited to these particular embodiments, and various forms made without departing from the spirit and scope of this invention are also encompassed by the present invention. Further, each of the above-described embodiments is only an embodiment of the present invention, and the embodiments may be combined as appropriate.

Also, although an example of applying the present invention to a digital camera has been described in the above-described embodiment, the present invention is not limited to this example, and is applicable to any electronic device having a shooting unit. That is to say, the present invention is applicable to personal computers, PDAs, mobile telephone terminals, portable image views, printer devices having displays, digital photo frames, music players, gaming devices, electronic book readers, and so forth.

Also, the present invention is not limited to an image-capturing device main unit that is a digital camera, and also is applicable to a control device that communicates with an image-capturing device (including a network camera) via wired or wireless communication, and remotely controls the image-capturing device. Examples of devices that remotely control the image-capturing device include devices such as smartphones, table PCs, desktop PCs, and so forth. The image-capturing device is remotely controllable from the control device side by notification of commands causing the image-capturing device to perform various types of actions and settings, on the basis of operations performed at the control device side and processing performed at the control device side. Also, an arrangement may be made in which live view images shot at the image-capturing device can be received via wired or wireless communication, and displayed at the control device side.

According to the present invention, an electronic device that is highly convenient for the user can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not restricted to the above embodiment, and various alterations and modifications may be made without departing from the spirit and scope of the present invention. Accordingly, the following Claims are attached to lay forth the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device capable of switching between a first mode for shooting a first type of image and a second mode for shooting a second type of image that is different from the first type of image, the electronic device comprising at least one memory and at least one processor which function as:

a setting unit configured to set a division setting for division of an image in accordance with a user operation;

a display control unit configured to perform control to display, on a display unit, a first assisting line that divides a region of the image on a basis of the division setting set by the setting unit, with the first assisting line being superimposed on the image, and configured to perform control to display the first assisting line superimposed on the image in accordance with one division setting set by the setting unit regardless of which of the first mode or the second mode; and a control unit configured to perform control such that, in the first mode, particular processing relating to shooting is inexecutable in a first region out of at least two regions created through dividing the image by the first assisting line, and the particular processing is executable in a second region out of the two regions, and perform control such that, in the second mode, the particular processing is executable in a region including the first region and the second region, wherein in a case where a predetermined setting is performed, the control unit performs control such that, regardless of either of the first mode and the second mode, the particular processing is executable in the region including the first region and the second region, and the predetermined setting is a setting of tracking a particular subject and continuing to focus on the particular subject in a case where a predetermined condition is satisfied.

2. The electronic device according to claim 1, wherein the setting unit sets an aspect ratio for dividing the image as the division setting, and the display control unit performs control such that an aspect marker having the aspect ratio set by the setting unit is displayed superimposed on the image.

3. The electronic device according to claim 1, wherein the first mode is a still-image shooting mode, and the second mode is a moving-image shooting mode.

4. The electronic device according to claim 1, wherein the first type of image is a still image, and the second type of image is a moving image.

5. The electronic device according to claim 1, wherein the display control unit is capable of performing further control to display, on the display unit, a second assisting line for confirming a position of a subject, with the second assisting line being superimposed on the image, and even in a case where the second assisting line is displayed on the image, the control unit does not perform control regarding whether or not the particular processing is to be executable in accordance with which region among a plurality of regions following division of the image by the second assisting line, but rather performs control so as to switch between whether or not the particular processing is to be executable in the plurality of regions in accordance with which of the first region and the second region that the plurality of regions are included in.

6. The electronic device according to claim 1, wherein the particular processing is processing relating to autofocusing.

7. The electronic device according to claim 6, wherein the particular processing is autofocusing.

8. The electronic device according to claim 6, wherein the particular processing is processing of displaying a guide indicating a focal state.

9. The electronic device according to claim 1, wherein the particular processing is processing of setting a center position in a case of performing enlarged display of an image.

10. The electronic device according to claim 1, wherein in a state in which a particular subject is tracked, the control unit performs control such that, regardless of either of the first mode and the second mode, the particular processing is executable in the region including the first region and the second region.

11. The electronic device according to claim 1, wherein the control unit performs control such that, even in the second mode, in a case where an aspect ratio of the first region is a predetermined aspect ratio, the particular processing relating to shooting is inexecutable in the first region, and the particular processing is executable in the second region.

12. The electronic device according to claim 1, wherein the control unit performs control such that, even in the first mode, in a case where an object of the particular processing is other than a person, the particular processing is executable in the region including the first region and the second region.

13. The electronic device according to claim 1, wherein the control unit performs control such that, even in the first mode, in a case where an object of the particular processing is a subject that is registered, the particular processing is executable in the region including the first region and the second region.

14. The electronic device according to claim 1, wherein the electronic device is an image-capturing device.

15. A control method of an electronic device capable of switching between a first mode for shooting a first type of image and a second mode for shooting a second type of image that is different from the first type of image, the method comprising:

a setting step of setting a division setting for division of an image in accordance with a user operation;

a display control step of performing control to display, on a display unit, a first assisting line that divides a region of the image on a basis of the division setting set in the setting step, with the first assisting line being superimposed on the image, and that performs control to display the first assisting line superimposed on the image in accordance with one division setting set in the setting step regardless of which of the first mode or the second mode;

a first control step of performing control such that, in the first mode, particular processing relating to shooting is inexecutable in a first region out of at least two regions created through dividing the image by the first assisting line, and the particular processing is executable in a second region out of the two regions; and a second control step of performing control such that, in the second mode, the particular processing is executable in a region including the first region and the second region, wherein in a case where a predetermined setting is performed, control is performed such that, regardless of either of the first mode and the second mode, the particular processing is executable in the region including the first region and the second region, and the predetermined setting is a setting of tracking a particular subject and continuing to focus on the particular subject in a case where a predetermined condition is satisfied.

16. A non-transitory computer readable medium that stores a program, wherein the program causes a computer to execute a control method of an electronic device including capable of switching between a first mode for shooting a first type of image and a second mode for shooting a second type of image that is different from the first type of image, the control method comprising:

a setting step of setting a division setting for division of an image in accordance with a user operation;

a display control step of performing control to display, on a display unit, a first assisting line that divides a region of the image on a basis of the division setting set in the setting step, with the first assisting line being superimposed on the image, and that performs control to display the first assisting line superimposed on the image in accordance with one division setting set in the setting step regardless of which of the first mode or the second mode;

a first control step of performing control such that, in the first mode, particular processing relating to shooting is inexecutable in a first region out of at least two regions created through dividing the image by the first assisting line, and the particular processing is executable in a second region out of the two regions; and a second control step of performing control such that, in the second mode, the particular processing is executable in a region including the first region and the second region, wherein in a case where a predetermined setting is performed, control is performed such that, regardless of either of the first mode and the second mode, the particular processing is executable in the region including the first region and the second region, and the predetermined setting is a setting of tracking a particular subject and continuing to focus on the particular subject in a case where a predetermined condition is satisfied.

17. An electronic device capable of switching between a first mode for shooting a first type of image and a second mode for shooting a second type of image that is different from the first type of image, the electronic device comprising at least one memory and at least one processor which function as:

a setting unit configured to set a division setting for division of an image in accordance with a user operation;

a display control unit configured to perform control to display, on a display unit, a first assisting line that divides a region of the image on a basis of the division setting set by the setting unit, with the first assisting line being superimposed on the image, and configured to perform control to display the first assisting line superimposed on the image in accordance with one division setting set by the setting unit regardless of which of the first mode or the second mode; and a control unit configured to perform control such that, in the first mode, particular processing relating to shooting is inexecutable in a first region out of at least two regions created through dividing the image by the first assisting line, and the particular processing is executable in a second region out of the two regions, and perform control such that, in the second mode, the particular processing is executable in a region including the first region and the second region, wherein the particular processing is processing of setting a center position in a case of performing enlarged display of an image.

\* \* \* \* \*